(12) United States Patent
Fujii

(10) Patent No.: US 12,362,630 B2
(45) Date of Patent: Jul. 15, 2025

(54) ELECTRIC WORK MACHINE

(71) Applicant: MAKITA CORPORATION, Anjo (JP)

(72) Inventor: Fuminari Fujii, Anjo (JP)

(73) Assignee: MAKITA CORPORATION, Anjo (JP)

( * ) Notice: Subject to any disclaimer, the term of this patent is extended or adjusted under 35 U.S.C. 154(b) by 252 days.

(21) Appl. No.: 18/180,612

(22) Filed: Mar. 8, 2023

(65) Prior Publication Data

US 2023/0299638 A1 Sep. 21, 2023

(30) Foreign Application Priority Data

Mar. 18, 2022 (JP) .................................. 2022-043884
Mar. 18, 2022 (JP) .................................. 2022-044428

(51) Int. Cl.
| | | |
|---|---|---|
| *H02K 7/14* | (2006.01) | |
| *H02K 1/14* | (2006.01) | |
| *H02K 5/08* | (2006.01) | |
| *H02K 5/16* | (2006.01) | |
| *H02K 15/043* | (2025.01) | |
| *H02K 29/08* | (2006.01) | |

(52) U.S. Cl.
CPC ............. *H02K 7/145* (2013.01); *H02K 1/148* (2013.01); *H02K 5/08* (2013.01); *H02K 5/16* (2013.01); *H02K 15/043* (2025.01); *H02K 29/08* (2013.01); *H02K 2203/09* (2013.01)

(58) Field of Classification Search
CPC ...... H02K 1/148; H02K 1/276; H02K 15/043; H02K 21/16; H02K 2203/09; H02K 29/08; H02K 5/08; H02K 5/10; H02K 5/16; H02K 5/18; H02K 5/225; H02K 7/145; H02K 9/06

See application file for complete search history.

(56) References Cited

U.S. PATENT DOCUMENTS

2004/0108779 A1* 6/2004 Boettger ................ H02K 7/083
   310/43
2006/0043816 A1* 3/2006 Tanimoto ............... H02K 7/145
   310/58

FOREIGN PATENT DOCUMENTS

| JP | 2006-067639 A | 3/2006 | |
|---|---|---|---|
| JP | 2021-062444 A | 4/2021 | |
| WO | WO-2018159537 A1 * | 9/2018 | ............... H02K 1/04 |
| WO | WO-2020255592 A1 * | 12/2020 | ............... H02K 5/02 |
| WO | WO-2021010015 A1 * | 1/2021 | ............. H02K 1/146 |
| WO | WO-2021124972 A1 * | 6/2021 | ............. H02K 1/146 |

* cited by examiner

*Primary Examiner* — Naishadh N Desai
(74) *Attorney, Agent, or Firm* — Oliff PLC

(57) ABSTRACT

An electric work machine includes: a motor comprising a stator including coils, a rotor rotatable relative to the stator, and a rotor shaft fixed to the rotor; an output unit driven by the rotor shaft; a motor case including a main body having an insertion opening, and a lid disposed on one side in an axial direction relative to the main body and connected to the main body to close the insertion opening; and a resin portion that includes a first portion covering the coils and a second portion disposed on one side in the axial direction relative to the first portion. The first and second portions are integrated. Each of the first and second portions has a tubular shape. A second inner diameter indicating an inner diameter of the second portion is larger than a first inner diameter indicating an inner diameter of the first portion.

20 Claims, 16 Drawing Sheets

ELECTRIC WORK MACHINE

CROSS-REFERENCE

This application claims priority to Japanese Patent Applications No. 2022-043884 filed in Japan on Mar. 18, 2022 and Japanese Patent Application No. 2022-044428 filed in Japan on Mar. 18, 2022, the contents of all of which are incorporated herein by reference.

TECHNICAL FIELD

The techniques disclosed in the present specification relate to an electric work machine.

BACKGROUND ART

In a technical field related to an electric work machine, a known electric tool is disclosed in Japanese Laid-open Patent Publication 2006-067639.

The electric work machine includes a motor as a power source. The motor includes: a stator including coil; and a rotor that rotates relative to the stator. When a drive current is supplied to the coil, the coil generates heat. Therefore, there is a demand for a technique capable of dissipating the heat of the coil. Furthermore, the coil is covered with a resin portion called a coil mold. There is a possibility that the weight of the electric work machine increases due to the resin portion.

Furthermore, depending on the specifications of the electric work machine, at least a part of the motor may be desired to be disposed in a closed space. When a drive current is supplied to the coil, the coil generates heat. In a case where the motor is disposed in the closed space, a temperature of the motor may rise excessively when the heat of the coil is not sufficiently dissipated.

An object of the present disclosure is to disclose techniques for suppressing an increase in weight of an electric work machine and dissipating heat of a coil.

SUMMARY OF THE INVENTION

In one non-limiting aspect of the present disclosure, an electric work machine may include a motor, an output unit, a motor case, and a resin portion. The motor may include: a stator including coils; a rotor that is rotatable relative to the stator; and a rotor shaft fixed to the rotor. The output unit may be driven by the rotor shaft. The motor case may include: a main body having an insertion opening; and a lid disposed on one side in an axial direction relative to the main body and connected to the main body to close the insertion opening. The motor case may accommodate the stator and the rotor. The resin portion may include a first portion covering the coils and a second portion disposed on one side in the axial direction relative to the first portion. The resin portion may be accommodated in the motor case. The first portion and the second portion may be integrated. Each of the first portion and the second portion may have a tubular shape. A second inner diameter indicating an inner diameter of the second portion may be larger than a first inner diameter indicating an inner diameter of the first portion.

In one non-limiting aspect of the present disclosure, an electric work machine may include a motor, an output unit, a motor case, a resin portion, a seal member, and a thermal conducting material. The motor may include a stator including coils, a rotor that is rotatable relative to the stator, and a rotor shaft fixed to the rotor. The output unit may be driven by the rotor shaft. The motor case may include a main body having an insertion opening, and a lid disposed on one side in an axial direction relative to the main body and connected to the main body to close the insertion opening. The motor case may accommodate the stator and the rotor. The resin portion may cover the coils and may be accommodated in the motor case. The seal member may seal a boundary between the main body and the lid. The thermal conducting material may be disposed between the lid and the resin portion.

DETAILED DESCRIPTION OF THE INVENTION

Figure 1:
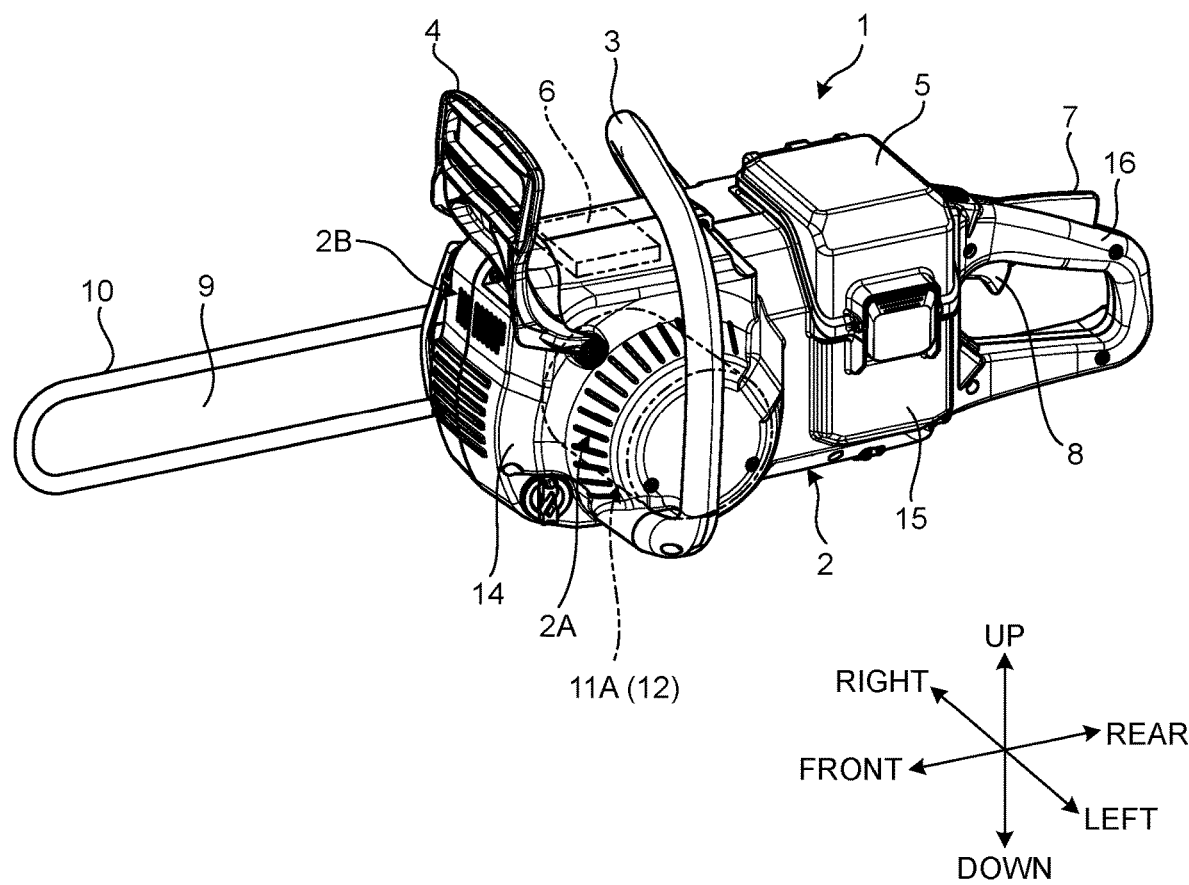
FIG. 1 is an oblique view, viewed from the left, which illustrates an electric work machine according to a first embodiment.

In one or more embodiments, an electric work machine may include a motor, an output unit, a motor case, and a resin portion. The motor may include: a stator including coils; a rotor that is rotatable relative to the stator; and a rotor shaft fixed to the rotor. The output unit may be driven by the rotor shaft. The motor case may include: a main body having an insertion opening; and a lid disposed on one side in an axial direction relative to the main body and connected to the main body to close the insertion opening. The motor case may accommodate the stator and the rotor. The resin portion may include a first portion covering the coils and a second portion disposed on one side in the axial direction relative to the first portion. The resin portion may be accommodated in the motor case. The first portion and the second portion may be integrated. Each of the first portion and the second portion may have a tubular shape. A second inner diameter indicating an inner diameter of the second portion may be larger than a first inner diameter indicating an inner diameter of the first portion.

According to the above-mentioned configuration, the heat of the coils is dissipated through the resin portion. The coils are covered with the first portion of the resin portion. The second inner diameter of the second portion disposed on the one side in the axial direction relative to the first portion is larger than the first inner diameter of the first portion. Therefore, an increase in the weight of the resin portion is suppressed. By suppressing the increase in the weight of the resin portion, an increase in the weight of the electric work machine is suppressed.

In one or more embodiments, the electric work machine may include a sensor board that supports a magnetic sensor that detects rotation of the rotor. The sensor board may be disposed radially inside the second portion.

According to the above-mentioned configuration, since the second inner diameter of the second portion is larger than the first inner diameter of the first portion, the narrowing of a space on a radially inner side of the second portion is suppressed. When the space in which the sensor board is disposed is small, it is necessary to downsize the sensor board. When the sensor board is downsized, there is a possibility that the size, position, number, and the like of electronic components mounted on the sensor board are restricted, or the degree of difficulty in mounting is increased. Since the narrowing of the space in which the sensor board is disposed is suppressed, it is not necessary to downsize the sensor board.

In one or more embodiments, the sensor board may be fixed to the lid.

According to the above-mentioned configuration, the stator is inserted inside the main body through the insertion opening, and the rotor is inserted inside the main body after at least a part of the stator is covered with the resin portion. After the stator, the resin portion, and the rotor are disposed inside the main body, the lid to which the sensor board is fixed and the main body are connected. As a result, each of the stator, the resin portion, the rotor, and the sensor board is appropriately accommodated in the motor case.

In one or more embodiments, the electric work machine may include a substrate screw that fixes the sensor board to the lid. The substrate screw may be disposed radially inside the second portion.

According to the above-mentioned configuration, since the narrowing of the space in which the sensor board and the substrate screw are disposed is suppressed, the substrate screw can properly fix the sensor board and the lid.

In one or more embodiments, at least a part of a first surface of the sensor board may faces an end surface of the rotor facing one side in the axial direction.

According to the above-mentioned configuration, the magnetic sensor of the sensor board can appropriately detect the rotation of the rotor.

In one or more embodiments, a second surface of the sensor board facing a side opposite to the first surface may face the lid.

According to the above-mentioned configuration, an increase in size of the motor case is suppressed.

In one or more embodiments, a peripheral edge region of the first surface may face an end surface of the first portion facing one side in the axial direction.

According to the above-mentioned configuration, downsizing of the sensor board is suppressed.

In one or more embodiments, an outer-circumferential surface of the sensor board may face an inner-circumferential surface of the second portion facing radially inward.

According to the above-mentioned configuration, an increase in size of the motor case is suppressed.

In one or more embodiments, the sensor board and the resin portion may be separated from each other.

According to the above-mentioned configuration, the heat of the coils is suppressed from being transmitted to the sensor board via the resin portion.

In one or more embodiments, at least a part of the second portion is in contact with the lid.

According to the above-mentioned configuration, the heat of the coils is transmitted to the lid via the first portion and the second portion of the resin portion. The heat of the coils transferred to the lid is dissipated to the space around the motor case.

In one or more embodiments, a second outer diameter indicating an outer diameter of the second portion may be larger than a first outer diameter indicating an outer diameter of the first portion.

According to the above-mentioned configuration, for example, the bus bar unit of the motor is appropriately covered with the second portion of the resin portion. The resin portion has not only a heat transfer function but also a waterproof function. Therefore, for example, the bus bar unit is covered with the second portion of the resin portion, whereby the bus bar unit is waterproofed. Furthermore, since the second outer diameter of the second portion is larger than the first outer diameter of the first portion, the second portion can cover not only the bus bar unit but also various parts housed in the motor case.

In one or more embodiments, at least a part of the second portion is in contact with the main body.

According to the above-mentioned configuration, the heat of the coils is transmitted to the main body via the first portion and the second portion of the resin portion. The heat of the coils transferred to the main body is dissipated to the space around the motor case.

In one or more embodiments, at least a part of the first portion is in contact with the main body.

According to the above configuration, the heat of the coils is transmitted to the main body through the first portion of the resin portion. The heat of the coils transferred to the main body is dissipated to the space around the motor case.

In one or more embodiments, the stator may include: a stator core having teeth; and an insulator fixed to the stator core. The coils may be respectively wound around the teeth via the insulator. The first portion may cover at least a part of the stator core and the insulator.

According to the above-mentioned configuration, not only the coils but also at least a part of the stator core and the insulator are covered with the first portion of the resin portion. As a result, the stator core and the insulator are protected by the resin portion. Furthermore, as described above, the resin portion has not only a heat transfer function but also a waterproof function. Therefore, the stator core and the insulator are waterproofed.

In one or more embodiments, the first inner diameter is substantially equal to an inner diameter of the stator core.

According to the above-mentioned configuration, an unnecessary increase in the volume of the first portion is suppressed.

In one or more embodiments, the electric work machine may include a bus bar unit including a short-circuit member that connects a pair of the coils and an insulating member that covers the short-circuit member. The second portion may cover the bus bar unit.

According to the above-mentioned configuration, the bus bar unit is protected by the resin portion. Furthermore, the bus bar unit is waterproofed by the resin portion.

In one or more embodiments, the bus bar unit may include an external terminal connected to a power supply line. A drive current for the coils may be supplied to the coils via the power supply line, the external terminal, and the short-circuit member.

According to the above-mentioned configuration, the external terminal of the bus bar unit is waterproofed by the resin portion.

In one or more embodiments, the bus bar unit may be fixed to the insulator.

According to the above-mentioned configuration, a change in the relative position between the bus bar unit and the insulator is suppressed.

In one or more embodiments, the electric work machine may include a bus bar screw that fixes the bus bar unit to the insulator. The second portion may cover the bus bar screw.

According to the above-mentioned configuration, the bus bar screw is protected by the resin portion.

In one or more embodiments, the electric work machine may include a seal member that seals a boundary between the main body and the lid.

According to the above-mentioned configuration, foreign matters around the motor case are prevented from entering the internal space of the motor case. The foreign matters around the motor case include dust and moisture.

In one or more embodiments, an electric work machine may include a motor, an output unit, a motor case, a resin portion, a seal member, and a thermal conducting material. The motor may include a stator including coils, a rotor that is rotatable relative to the stator, and a rotor shaft fixed to the rotor. The output unit may be driven by the rotor shaft. The motor case may include a main body having an insertion opening, and a lid disposed on one side in an axial direction relative to the main body and connected to the main body to close the insertion opening. The motor case may accommodate the stator and the rotor. The resin portion may cover the coils and may be accommodated in the motor case. The seal member may seal a boundary between the main body and the lid. The thermal conducting material may be disposed between the lid and the resin portion.

According to the above-mentioned configuration, the seal member prevents foreign matters around the motor case from entering the internal space of the motor case. The foreign matters around the motor case include dust and moisture. By disposing a thermal conducting material between the lid and the resin portion, the heat of the coils is transmitted to the lid via the resin portion and the thermal conducting material. The heat of the coils transferred to the lid is dissipated to the space around the motor case. For example, even when the gap between the resin portion and the lid becomes large in a state where the main body and the lid are connected such that the seal member is compressed due to a dimensional error of the resin portion, the gap between the resin portion and the lid is filled with the thermal conducting material.

In one or more embodiments, the thermal conducting material may be in contact with both the lid and the resin portion.

According to the above-mentioned configuration, the heat of the coils is efficiently transferred to the lid via the resin portion and the thermal conducting material.

In one or more embodiments, the thermal conducting material may include a thermal conductive sheet.

According to the above-mentioned configuration, a decrease in workability when the thermal conducting material is disposed between the resin portion and the lid is suppressed.

In one or more embodiments, the thermal conductive sheet may be disposed, in a compressed state, between the lid and the resin portion.

According to the above-mentioned configuration, the thermal conductive sheet can be in close contact with each of the lid and the resin portion. Therefore, the heat of the coils is efficiently transmitted to the lid via the resin portion and the thermal conductive sheet.

In one or more embodiments, at least a part of the resin portion may be in contact with the main body.

According to the above-mentioned configuration, the heat of the coils is efficiently transferred to the main body through the resin portion. The heat of the coils transferred to the main body is dissipated to the space around the motor case.

In one or more embodiments, the lid may include a contact region in contact with the thermal conducting material, and a connection region disposed around the insertion opening and connected to a peripheral edge region of the main body facing one side in the axial direction.

According to the above-mentioned configuration, the heat of the coils is efficiently transmitted to the lid via the resin portion and the thermal conducting material, and the main body and the lid are appropriately connected.

In one or more embodiments, the contact region may be disposed on one side in the axial direction relative to the connection region.

According to the above-mentioned configuration, a decrease in workability when the main body and the lid are connected is suppressed. Furthermore, an increase in size of the motor case is suppressed.

In one or more embodiments, the seal member may seal a boundary between the peripheral edge region of the main body and the connection region of the lid.

According to the above-mentioned configuration, the seal member prevents foreign matters around the motor case from entering the internal space of the motor case.

In one or more embodiments, the seal member may be disposed, in a compressed state, between the main body and the lid.

According to the above-mentioned configuration, the seal member can be in close contact with each of the main body and the lid. Therefore, foreign matters around the motor case are prevented from entering the internal space of the motor case.

In one or more embodiments, the resin portion may include a first portion covering the coils, and a second portion disposed on one side in the axial direction relative to the first portion. The first portion and the second portion may be integrated. Each of the first portion and the second portion may have a tubular shape. A second inner diameter indicating an inner diameter of the second portion may be larger than a first inner diameter indicating an inner diameter of the first portion. The thermal conducting material may be disposed between the lid and the second portion.

According to the above-mentioned configuration, a second inner diameter of the second portion disposed on the one side in the axial direction relative to the first portion is larger than a first inner diameter of the first portion. Therefore, an increase in the weight of the resin portion is suppressed. By suppressing the increase in the weight of the resin portion, an increase in the weight of the electric work machine is suppressed.

In one or more embodiments, an electric work machine may include a motor, an output unit, a motor case, a resin portion, and a seal member. The motor may include: a stator including coils; a rotor that is rotatable relative to the stator; and a rotor shaft fixed to the rotor. The output unit may be driven by the rotor shaft. The motor case may include: a main body having an insertion opening; and a lid disposed on one side in an axial direction relative to the main body and connected to the main body to close the insertion opening. The motor case may accommodate the stator and the rotor. The resin portion may cover the coils and may be accommodated in the motor case. The seal member may seal a boundary between the main body and the lid. The lid may include a contact region in contact with the resin portion and a connection region disposed around the insertion opening and connected to a peripheral edge region of the main body facing one side in the axial direction. The peripheral edge region of the main body and an end surface of the resin portion facing the contact region may be disposed in a same plane. The contact region and the connection region may be disposed in a same plane.

According to the above-mentioned configuration, the seal member prevents foreign matters around the motor case from entering the internal space of the motor case. The foreign matters around the motor case include dust and moisture. Since the lid has the contact region in contact with the resin portion, the heat of the coils is efficiently transmitted to the lid via the resin portion. The heat of the coils transferred to the lid is dissipated to the space around the motor case. Since the peripheral edge region of the main body and the end surface of the resin portion are disposed in the same plane, and the contact region of the lid and the connection region are disposed in the same plane, it is possible to suppress an increase in the gap between the resin portion and the lid in a state where the main body and the lid are connected such that the seal member is compressed.

In one or more embodiments, the peripheral edge region of the main body and the connection region of the lid may come into contact with each other in a state where the end surface of the resin portion and the contact region of the lid are in contact with each other.

According to the above-mentioned configuration, the heat of the coils is efficiently transmitted to the lid through the resin portion, and the main body and the lid are appropriately connected.

In one or more embodiments, the seal member may seal a boundary between the peripheral edge region of the main body and the connection region of the lid.

According to the above-mentioned configuration, the seal member prevents foreign matters around the motor case from entering the internal space of the motor case.

In one or more embodiments, the seal member may be disposed, in a compressed state, between the main body and the lid.

According to the above-mentioned configuration, the seal member can be in close contact with each of the main body and the lid. Therefore, foreign matters around the motor case are prevented from entering the internal space of the motor case.

In one or more embodiments, at least a part of the resin portion may be in contact with the main body.

According to the above-mentioned configuration, the heat of the coils is efficiently transferred to the main body through the resin portion. The heat of the coils transferred to the main body is dissipated to the space around the motor case.

In one or more embodiments, the resin portion may include a first portion covering the coils, and a second portion disposed on one side in the axial direction relative to the first portion. The first portion and the second portion may be integrated. Each of the first portion and the second portion may have a tubular shape. A second inner diameter indicating an inner diameter of the second portion may be larger than a first inner diameter indicating an inner diameter of the first portion. An end surface of the resin portion may include an end surface of the second portion.

According to the above-mentioned configuration, a second inner diameter of the second portion disposed on the one side in the axial direction relative to the first portion is larger than a first inner diameter of the first portion. Therefore, an increase in the weight of the resin portion is suppressed. By suppressing the increase in the weight of the resin portion, an increase in the weight of the electric work machine is suppressed.

In one or more embodiments, an electric work machine may include a motor, an output unit, a motor case, a resin portion, and a seal member. The motor may include: a stator including coils; a rotor that is rotatable relative to the stator; and a rotor shaft fixed to the rotor. The output unit may be driven by the rotor shaft. The motor case may include a main body having an insertion opening, and a lid disposed on one side in an axial direction relative to the main body and connected to the main body to close the insertion opening. The motor case may accommodate the stator and the rotor. The resin portion may cover the coils and may be accommodated in the motor case. The seal member may seal a boundary between the main body and the lid. The lid may include: a contact region in contact with the resin portion; a facing region disposed around the insertion opening and facing a peripheral edge region of the main body facing one side in the axial direction; and an inner-circumferential region connected to an outer-circumferential region of the main body facing radially outward.

According to the above-mentioned configuration, the seal member prevents foreign matters around the motor case from entering the internal space of the motor case. The foreign matters around the motor case include dust and moisture. Since the lid has the contact region in contact with the resin portion, the heat of the coils is efficiently transmitted to the lid via the resin portion. The heat of the coils transferred to the lid is dissipated to the space around the motor case. Since the outer-circumferential region of the main body and the inner-circumferential region of the lid are connected, it is possible to suppress an increase in a gap between the resin portion and the lid in a state where the main body and the lid are connected such that the seal member is compressed.

In one or more embodiments, the seal member may seal a boundary between the outer-circumferential region of the main body and the inner-circumferential region of the lid.

According to the above-mentioned configuration, the seal member prevents foreign matters around the motor case from entering the internal space of the motor case.

In one or more embodiments, an end surface of the resin portion facing the contact region may be disposed on one side in the axial direction relative to a peripheral edge region of the main body. The contact region and the facing region may be disposed in a same plane.

According to the above-mentioned configuration, the peripheral edge region of the main body and the facing region of the lid face each other with the gap interposed therebetween, and the end surface of the resin portion and the contact region of the lid are in contact with each other. The heat of the coils is efficiently transmitted to the lid through the resin portion by the contact between the lid and the resin portion, and the main body and the lid are appropriately connected in a state where the seal member is compressed.

In one or more embodiments, the resin portion may include a first portion covering the coils, and a second portion disposed on one side in the axial direction relative to the first portion. The first portion and the second portion may be integrated. Each of the first portion and the second portion may have a tubular shape. A second inner diameter indicating an inner diameter of the second portion may be larger than a first inner diameter indicating an inner diameter of the first portion. An end surface of the resin portion may include an end surface of the second portion.

According to the above-mentioned configuration, a second inner diameter of the second portion disposed on the one side in the axial direction relative to the first portion is larger than a first inner diameter of the first portion. Therefore, an increase in the weight of the resin portion is suppressed. By suppressing the increase in the weight of the resin portion, an increase in the weight of the electric work machine is suppressed.

Hereinafter, embodiments according to the present disclosure will be described with reference to the drawings, but the present disclosure is not limited to the embodiments. The structural elements of the embodiments described below can be combined where appropriate. Furthermore, there are also situations in which some of the structural elements are not used.

In the embodiment, positional relationships among parts will be described using the terms "left", "right", "front", "rear", "up", and "down". These terms indicate relative positions or directions, using the center of an electric work machine 1 as a reference.

The electric work machine 1 includes a motor 12. In the embodiment, a direction parallel to a rotation axis AX of the motor 12 is appropriately referred to as an axial direction. The radiation direction of the rotation axis AX of the motor 12 is appropriately referred to as a radial direction. A direction around the rotation axis AX of the motor 12 is appropriately referred to as a circumferential direction or a rotation direction.

In the axial direction, a position close to or a direction approaching the center of the motor 12 is referred to as axially inward where appropriate, and a position far from or a direction away from the center of the motor 12 is referred to as axially outward where appropriate. A position on one side or a direction on one side in the axial direction is referred to as one side in the axial direction where appropriate, and a position on the other side or a direction on the other side in the axial direction is referred to as the other side in the axial direction where appropriate. In the radial direction, a position close to or a direction approaching the rotation axis AX of the motor 12 is referred to as radially inward where appropriate, and a position far from or a direction away from the rotation axis AX of the motor 12 is appropriately referred to as radially outward where appropriate. A position on one side or a direction on one side in the circumferential direction is referred to as one side in the circumferential direction where appropriate, and a position on the other side or a direction on the other side in the circumferential direction is referred to as the other side in the circumferential direction where appropriate.

First Embodiment

A first embodiment will be described.

Electric Work Machine

FIG. 1 is an oblique view, viewed from the left, which illustrates the electric work machine 1 according to the present embodiment. In the present embodiment, the electric work machine 1 is a chain saw which is a type of an outdoor power equipment.

The electric work machine 1 includes a housing 2, a front grip portion 3, a hand guard 4, a battery cover 5, a controller 6, a trigger lock lever 7, a trigger switch 8, a guide bar 9, a saw chain 10, and a motor assembly 11A.

The housing 2 is formed of synthetic resin. The housing 2 includes a motor housing portion 14, a battery holder 15, and a rear grip portion 16.

The motor housing portion 14 houses therein the motor assembly 11A. The motor assembly 11A includes a motor 12.

The battery holder 15 holds a battery pack (not illustrated). The battery holder 15 includes a battery mounting unit to which the battery pack is mounted. The battery holder 15 holds the battery pack via the battery mounting unit. The battery holder 15 is connected to the rear end portion of the motor housing portion 14. The battery cover 5 is disposed so as to cover the battery pack held by the battery holder 15.

The battery pack is detachable from the battery holder 15. The battery pack includes a secondary battery. In the present embodiment, the battery pack includes a rechargeable lithium ion battery. The battery pack functions as a power supply unit of the electric work machine 1. The battery pack can supply electric power to the electric work machine 1 by being held by the battery holder 15.

The rear grip portion 16 is gripped by a hand of a worker who uses the electric work machine 1. The rear grip portion 16 is connected to a rear end portion of the battery holder 15. A part of the rear grip portion 16 is connected to an upper portion of a rear end portion of the battery holder 15. A part of the rear grip portion 16 is connected to a lower portion of a rear end portion of the battery holder 15.

An intake port 2A is provided in the left portion of the motor housing portion 14. An exhaust port 2B is provided in the front portion of the motor housing portion 14. Air outside the housing 2 can flow into the housing 2 through the intake port 2A. The air inside the housing 2 can flow out to the outside of the housing 2 through the exhaust port 2B.

The front grip portion 3 is gripped by a hand of an operator. The front grip portion 3 is made of synthetic resin. The front grip portion 3 is a pipe-shaped member. The front grip portion 3 is connected to the housing 2. The left end portion of the front grip portion 3 is connected to the left side surface of the motor housing portion 14. The right end portion of the front grip portion 3 is connected to the right side surface of the battery holder 15.

The hand guard 4 protects a hand of an operator gripping the front grip portion 3. The hand guard 4 is disposed in front of the front grip portion 3. The hand guard 4 is connected to an upper portion of the motor housing portion 14.

The controller 6 outputs a control signal for controlling the electric work machine 1. The controller 6 controls a drive current supplied from the battery pack to the motor 12. The controller 6 is housed in the motor housing portion 14.

The trigger lock lever 7 is operated by an operator of the electric work machine 1 so that the trigger switch 8 can be operated. The trigger lock lever 7 is disposed on the rear grip portion 16.

The trigger switch 8 is operated by an operator of the electric work machine 1 to drive the motor 12. The trigger switch 8 is disposed on the rear grip portion 16. After gripping the rear grip portion 16 with a hand and operating the trigger lock lever 7, the operator can operate the trigger switch 8 with a finger. When the trigger switch 8 is operated, a drive current is supplied to the motor 12, and the motor 12 is driven.

The guide bar 9 guides the saw chain 10. The guide bar 9 is a plate-shaped member that is long in the front-rear direction. The guide bar 9 extends forward from the housing 2.

The saw chain 10 is an output unit of the electric work machine 1 driven by the motor 12. The saw chain 10 includes a plurality of cutters coupled together. The saw chain 10 is arranged on a peripheral edge portion of the guide bar 9. The motor 12 and the saw chain 10 are connected via a power transmission mechanism (not illustrated) including a sprocket. When the trigger switch 8 is operated and the motor 12 is driven, the saw chain 10 moves on the peripheral edge portion of the guide bar 9.

Motor Assembly

Figure 2:
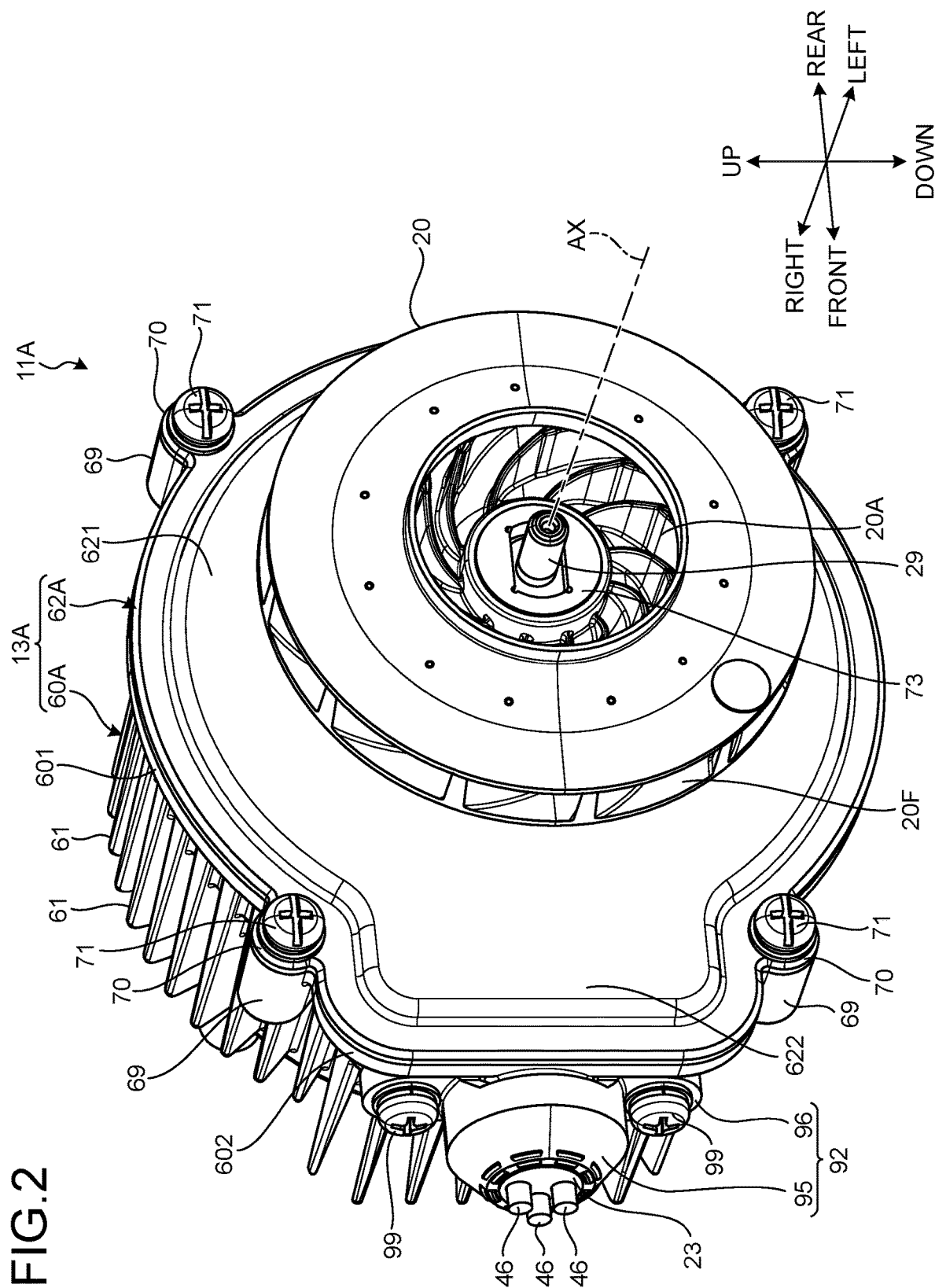
FIG. 2 is an oblique view, viewed from the left, which illustrates a motor assembly according to the first embodiment.
Figure 3:
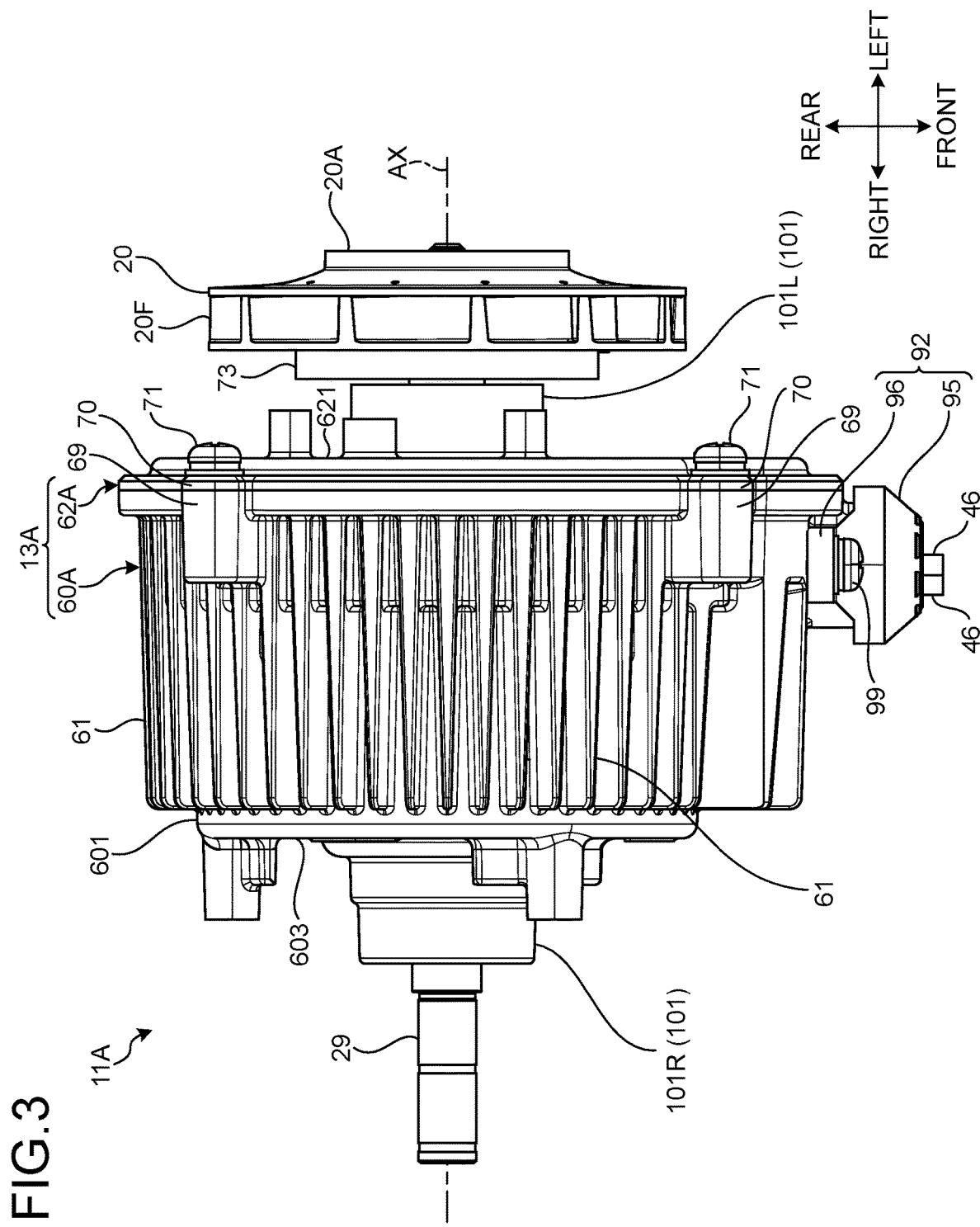
FIG. 3 is a side view illustrating the motor assembly according to the first embodiment.
Figure 4:
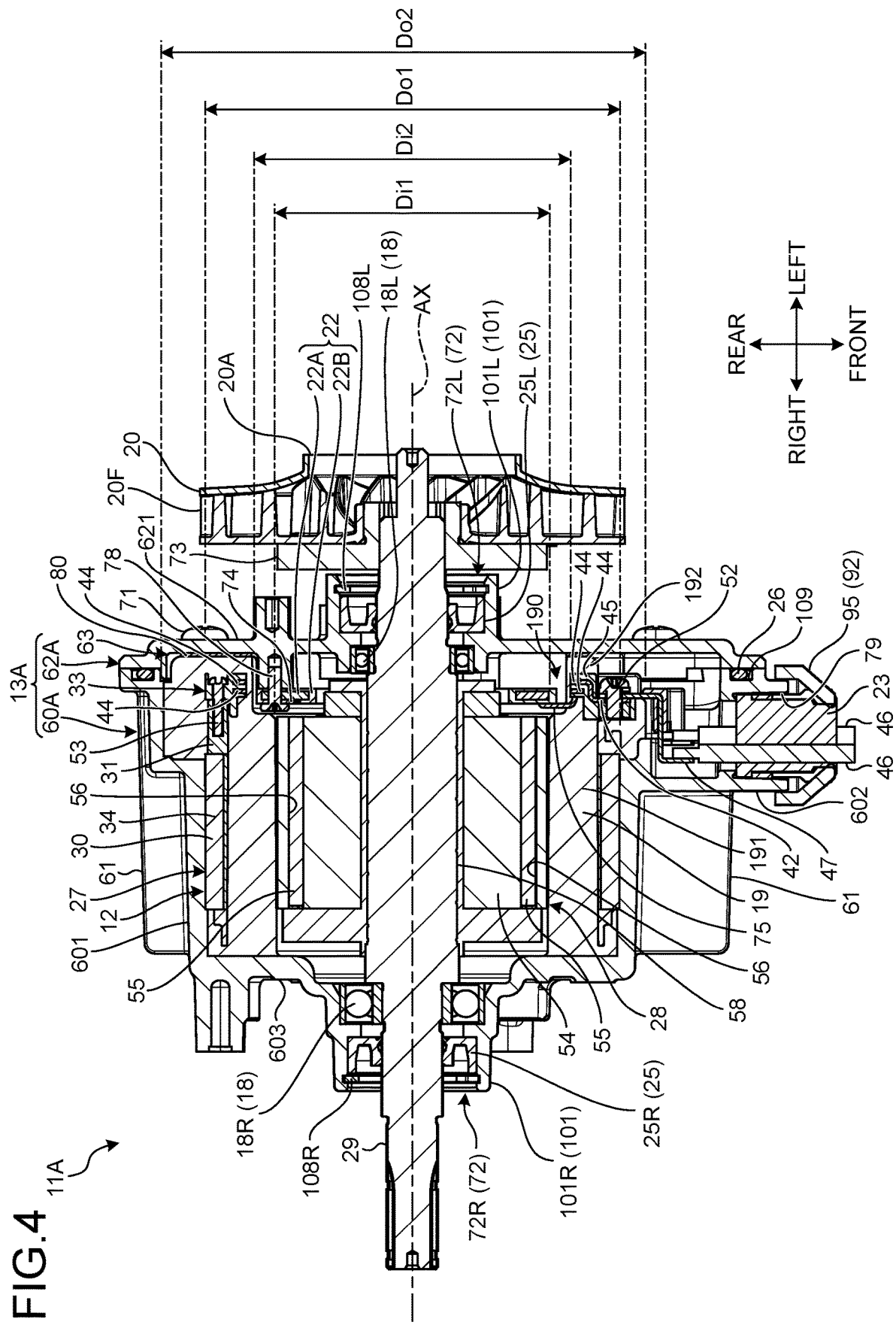
FIG. 4 is a longitudinal sectional view illustrating the motor assembly according to the first embodiment.
Figure 5:
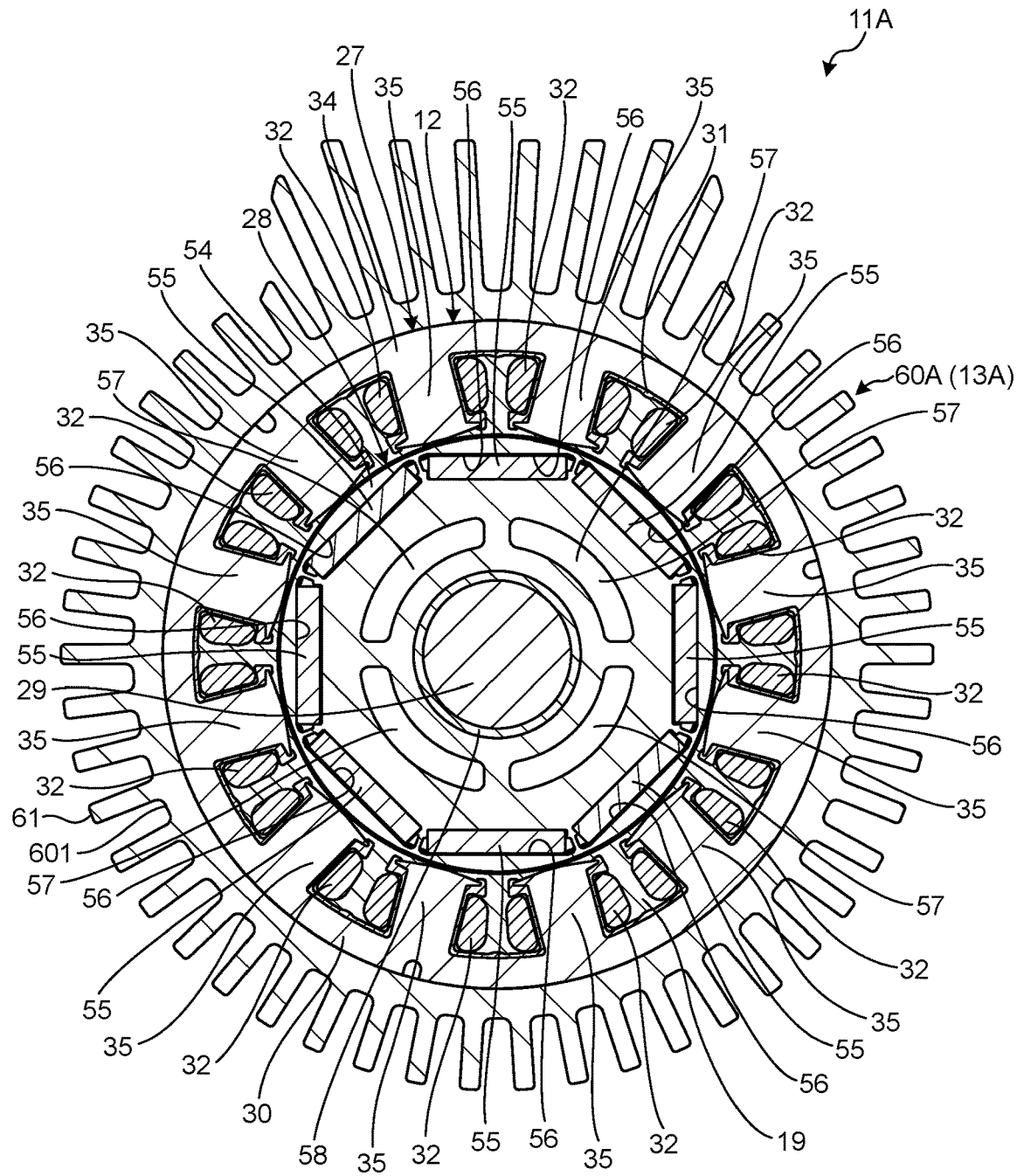
FIG. 5 is a transverse sectional view illustrating the motor assembly according to the first embodiment.
Figure 6:
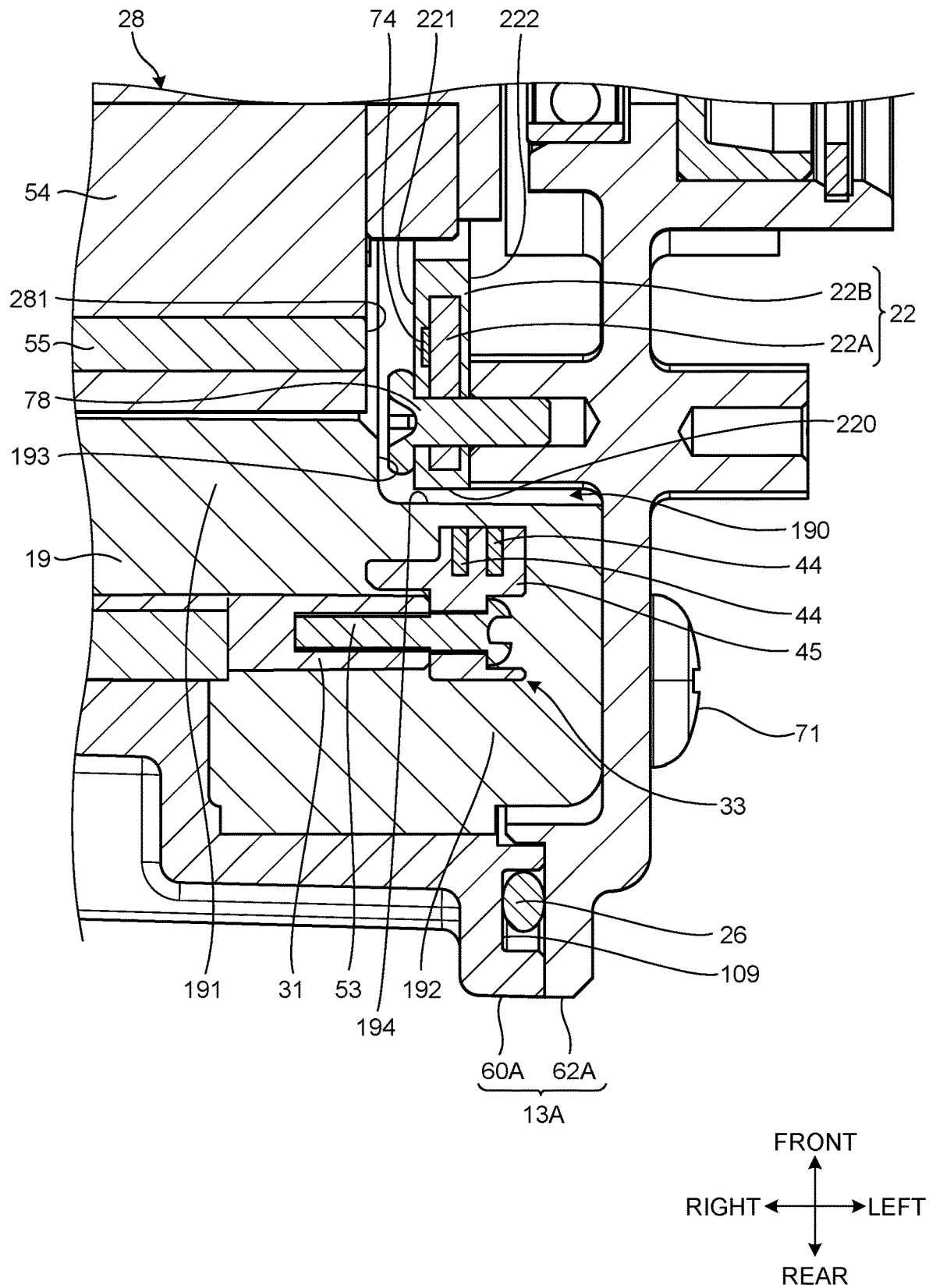
FIG. 6 is an enlarged longitudinal sectional view of a part of the motor assembly according to the first embodiment.
Figure 7:
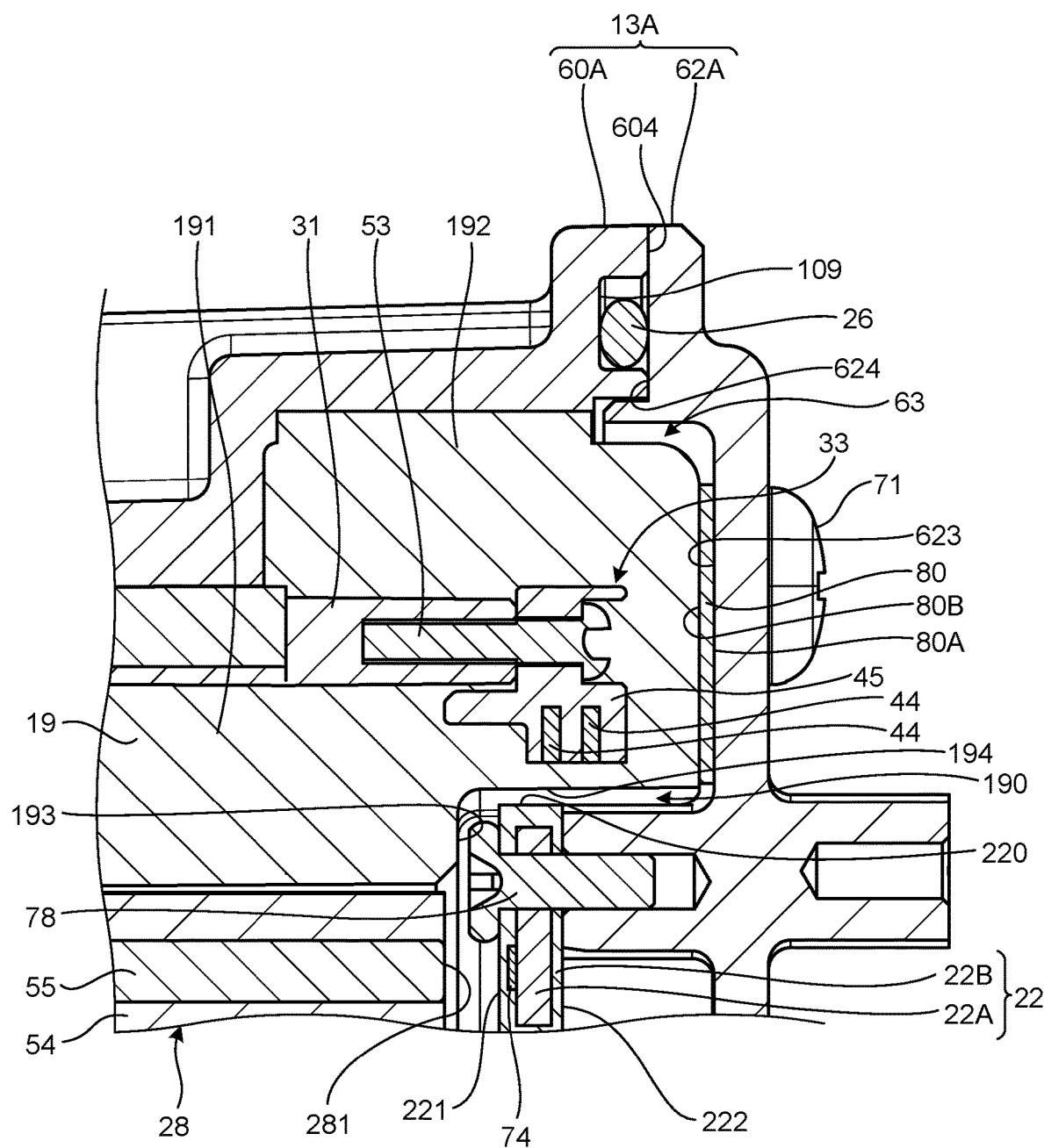
FIG. 7 is an enlarged longitudinal sectional view of a part of the motor assembly according to the first embodiment.
Figure 8:
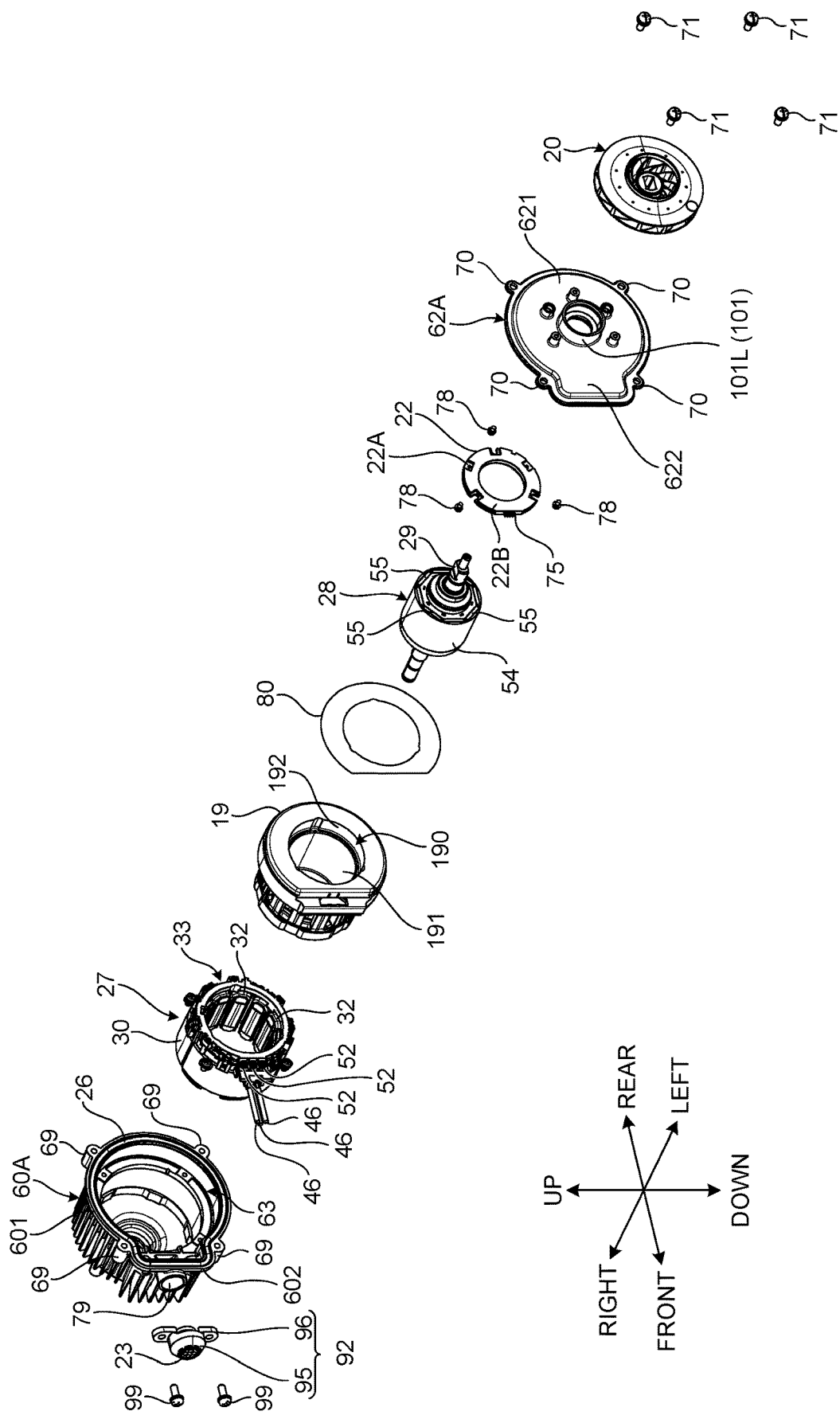
FIG. 8 is an exploded oblique view, viewed from the left, which illustrates the motor assembly according to the first embodiment.

FIG. 2 is an oblique view, viewed from the left, which illustrates the motor assembly 11A according to the present embodiment. FIG. 3 is a side view illustrating the motor assembly 11A according to the present embodiment. FIG. 4 is a longitudinal sectional view illustrating the motor assembly 11A according to the present embodiment. FIG. 5 is a transverse sectional view illustrating the motor assembly 11A according to the present embodiment. FIG. 6 is an enlarged longitudinal sectional view of a part of the motor assembly 11A according to the present embodiment. FIG. 7 is an enlarged longitudinal sectional view of a part of the motor assembly 11A according to the present embodiment. FIG. 8 is an exploded oblique view, viewed from the left, which illustrates the motor assembly 11A according to the present embodiment.

The motor assembly 11A includes a motor 12, a motor case 13A, bearings 18, a cooling fan 20, a sensor board 22, seal members 25, a seal member 26, a seal member 23, a resin portion 19, and a thermal conducting material 80.

The motor 12 is a power source of the electric work machine 1. The motor 12 is an electric motor that is driven based on a drive current supplied from the battery pack.

The motor 12 is an inner rotor brushless motor. The motor 12 includes a stator 27, a rotor 28 that is rotatable relative to the stator 27, and a rotor shaft 29 fixed to the rotor 28. The stator 27 is disposed so as to surround at least a part of the rotor 28. The rotor 28 rotates about the rotation axis AX. The saw chain 10 is driven by the rotor shaft 29.

In the present embodiment, the rotation axis AX of the rotor 28 extends in the left-right direction. The axial direction parallel to the rotation axis AX coincides with the left-right direction. In the present embodiment, one side in the axial direction is a left side, and the other side in the axial direction is a right side.

The stator 27 includes a stator core 30, an insulator 31, coils 32, and a bus bar unit 33.

The stator core 30 includes a plurality of laminated steel plates. Each of the steel plates is a metal plate containing iron as a main component. The stator core 30 includes an annular yoke 34 and teeth 35 protruding radially inward from an inner surface of the yoke 34. The yoke 34 is disposed so as to surround the rotation axis AX. A plurality of the teeth 35 is disposed in the circumferential direction. In the present embodiment, twelve of the teeth 35 are arranged. The plurality of teeth 35 are arranged at equal intervals in the circumferential direction.

The insulator 31 covers at least a part of the surface of the stator core 30. The insulator 31 covers at least the coils supporting surfaces of the teeth 35 around which the coils 32 are respectively wound. The insulator 31 is made of synthetic resin. The insulator 31 is fixed to the stator core 30. The insulator 31 is integrally molded with the stator core 30. The insulator 31 is fixed to the stator core 30 by insert molding.

The coils 32 are respectively wound around the teeth 35 via the insulator 31. The coils 32 and the stator core 30 are insulated by the insulator 31. A plurality of the coils 32 is provided in the circumferential direction. In the present embodiment, twelve of the coils 32 are provided.

The bus bar unit 33 is fixed to the insulator 31 by bus bar screws 53. The drive current from the battery pack is supplied to the bus bar unit 33 via the controller 6.

The bus bar unit 33 includes external terminals 42, short-circuit members 44, and an insulating member 45.

The external terminals 42 are connected to the short-circuit members 44 and connection terminals 47, respectively. The external terminals 42 are connected to the coils 32 via the short-circuit members 44. Each of the short-circuit members 44 electrically connects (short-circuits) a pair of the coils 32 opposite of each other in the radial direction. The connection terminals 47 are electrically connected to power supply lines 46. The external terminals 42 are electrically connected to the power supply lines 46 via the connection terminals 47. The external terminals 42 and the connection terminals 47 are fixed by screws 52. The external terminals 42 are connected to the battery pack via the connection terminals 47, the power supply lines 46, and the controller 6. The power supply lines 46 are lead wires connected to the coils 32 via the connection terminals 47, the external terminals 42, and the short-circuit members 44. Drive currents for the coil 32s are output from the battery pack. The drive currents for the coils 32 output from the battery pack are supplied to the coils 32 via the controller 6, the power supply lines 46, the connection terminals 47, the external terminals 42, and the short-circuit members 44.

The insulating member 45 is made of synthetic resin. The insulating member 45 is provided so as to surround the rotation axis AX. The insulating member 45 covers the short-circuit members 44. The short-circuit members 44 are disposed inside the insulating member 45. The insulating member 45 supports the external terminals 42 and the short-circuit members 44.

The controller 6 controls drive currents supplied from the battery pack to the bus bar unit 33. The drive currents from the battery pack are supplied to the external terminals 42 of the bus bar unit 33 via the controller 6, the power supply lines 46, and the connection terminals 47. The drive currents supplied from the battery pack to the external terminals 42 flow through the short-circuit members 44 and then are supplied to the coils 32.

The rotor 28 includes a rotor core 54 and rotor magnets 55.

The rotor core 54 includes a plurality of laminated steel plates. Each of the steel plates is a metal plate containing iron as a main component. The rotor core 54 is disposed so as to surround the rotation axis AX. The stator core 30 is disposed around the rotor core 54.

The rotor magnets 55 are permanent magnets. The rotor magnets 55 are supported by the rotor core 54. The rotor magnets 55 are disposed in the interior of the rotor core 54. A plurality of the rotor magnets 55 is provided in the circumferential direction. In the present embodiment, eight of the rotor magnets 55 are provided.

The rotor core 54 has a plurality of magnet holes 56 provided at intervals in the circumferential direction. Each of the magnet hole 56 is formed so as to penetrate the left end surface and the right end surface of the rotor core 54. The rotor magnets 55 are disposed in the magnet holes 56.

In the present embodiment, the rotor core 54 has a plurality of hollow holes 57 provided at intervals in the circumferential direction. Each of the hollow holes 57 is formed so as to penetrate the left end surface and the right end surface of the rotor core 54. The hollow holes 57 are provided radially inward relative to magnet holes 56. In the present embodiment, four of the hollow holes 57 are provided. The hollow holes 57 reduces the weight of the rotor core 54.

The rotor shaft 29 extends in the axial direction. The central axis of the rotor shaft 29 and the rotation axis AX coincide with each other. The rotor shaft 29 is disposed in the interior of the rotor core 54. The rotor core 54 and the rotor shaft 29 are fixed to each other. In the present embodiment, a tubular member 58 is disposed around the rotor shaft 29. The tubular member 58 is formed of an electrically insulating material. The rotor shaft 29 is fixed to the rotor core 54 via the tubular member 58. A left portion of the rotor shaft 29 protrudes leftward from the left end surface of the rotor core 54. A right portion of the rotor shaft 29 protrudes rightward from the right end surface of the rotor core 54.

When the drive currents are supplied from the battery pack to the coils 32 via the controller 6, a rotating magnetic fields are generated in the stator 27. When the rotating magnetic fields are generated, the rotor 28 and the rotor shaft 29 rotate about the rotation axis AX.

The motor case 13A accommodates therein at least a part of the motor 12. In the present embodiment, the motor case 13A accommodates therein at least the stator 27 and the rotor 28. The motor case 13A has an internal space in which the stator 27 and the rotor 28 are disposed. In the internal space of the motor case 13A, the stator 27 is disposed so as to surround at least a part of the rotor 28. The internal space is a closed space. In the present embodiment, the internal space is a substantially sealed space. A part of the rotor shaft 29 is disposed in the internal space.

The motor case 13A is made of metal. In the present embodiment, the motor case 13A is made of aluminum. The motor case 13A may be made of aluminum die-cast (ADC12).

The motor case 13A includes a main body 60A and a lid 62A.

The main body 60A accommodates therein the stator 27 and the rotor 28. The stator 27 and the rotor 28 are disposed inside the main body 60A.

The main body 60A includes a cylindrical portion 601, a lead wire holder 602, and a wall portion 603. The cylindrical portion 601 is provided so as to surround the rotation axis AX. The lead wire holder 602 is provided at the front portion of the cylindrical portion 601. The lead wire holder 602 protrudes forward from the front portion of the cylindrical portion 601. The wall portion 603 is connected to a right end portion of the cylindrical portion 601. An insertion opening 63 is provided at a left end portion of the main body 60A. The stator 27 is inserted into the main body 60A through the insertion opening 63.

Heat dissipation fins 61 are provided on an outer surface of the cylindrical portion 601. The heat dissipation fin 61 are provided so as to protrude radially outward from the outer surface of the cylindrical portion 601. Each of the heat dissipation fins 61 is disposed so as to extend along the axial direction on the outer surface of the cylindrical portion 601. A plurality of the heat dissipation fins 61 is provided at intervals in the circumferential direction.

The main body 60A includes a wiring passage 79 in which the power supply lines 46 are disposed. The wiring passage 79 is provided so as to connect the internal space of the motor case 13A and the external space of the motor case 13A. The wiring passage 79 is provided in the lead wire holder 602.

The lid 62A is connected to the main body 60A so as to close the insertion opening 63 of the main body 60A. In the present embodiment, the lid 62A is disposed leftward (on one side in the axial direction) relative to the main body 60A. By connecting the main body 60A and the lid 62A such that the insertion opening 63 is closed by the lid 62A, an internal space is formed between the main body 60A and the lid 62A. After at least a part of the motor 12 including the stator 27 is arranged inside the main body 60A, the insertion opening 63 of the main body 60A is closed by the lid 62A, whereby at least a part of the motor 12 is arranged in the internal space.

In the main body 60A, a plurality of screw boss parts 69 is provided around the insertion opening 63. In the present embodiment, four of the screw boss parts 69 are provided at intervals in the circumferential direction. A screw hole is provided in each of the screw boss parts 69. A plurality of screw boss parts 70 is provided on a peripheral edge portion of the lid 62A. In the present embodiment, four of the screw boss parts 70 are provided at intervals in the circumferential direction. Each of the plurality of screw boss parts 70 is provided with an opening. In a state where the intermediate portion of a screw 71 is disposed in the opening of the screw boss part 70, the distal end portion of the screw 71 is coupled to the screw hole of the screw boss part 69, whereby the main body 60A and the lid 62A are fixed to each other.

The lid 62A includes a disk portion 621 and a lead wire holder 622. The disk portion 621 is connected to the cylindrical portion 601. The lead wire holder 622 is connected to the lead wire holder 602. The lead wire holder 622 is provided at the front portion of the disk portion 621.

The bearings 18 support the rotor shaft 29. The rotor shaft 29 is rotatably supported by the bearings 18. The bearings 18 are supported by the motor case 13A.

The motor case 13A has shaft holes 72 in which at least a part of the rotor shaft 29 is disposed. The shaft holes 72 are provided so as to connect the internal space of the motor case 13A and the external space of the motor case 13A. The shaft holes 72 include a shaft hole 72L in which the left portion of the rotor shaft 29 is disposed and a shaft hole 72R in which the right portion of the rotor shaft 29 is disposed. The shaft hole 72L is provided in the disk portion 621 of the lid 62A. The shaft hole 72R is provided in the wall portion 603 of the main body 60A.

The motor case 13A has peripheral wall portions 101 that define the shaft holes 72. Each of the peripheral wall portions 101 has a substantially cylindrical shape. The peripheral wall portions 101 includes a peripheral wall portion 101L defining the shaft hole 72L and a peripheral wall portion 101R defining the shaft hole 72R. The peripheral wall portion 101L is provided on the disk portion 621 of the lid 62A. The peripheral wall portion 101L protrudes leftward from the left surface of the disk portion 621. The peripheral wall portion 101R is provided on the wall portion 603 of the main body 60A. The peripheral wall portion 101R protrudes rightward from the right surface of the wall portion 603.

The bearings 18 include a left bearing (first bearing) 18L supporting the left portion of the rotor shaft 29 and a right bearing (second bearing) 18R supporting the right portion of the rotor shaft 29. The left bearing 18L is disposed in the shaft hole 72L. The right bearing 18R is disposed in the shaft hole 72R. The left portion (one end) of the rotor shaft 29 is rotatably supported by the left bearing (first bearing) 18L. The right portion (another end) of the rotor shaft 29 is rotatably supported by the right bearing (second bearing) 18R.

The left end portion and the right end portion of the rotor shaft 29 are disposed outside the motor case 13A. A right end portion of the rotor shaft 29 is connected to the saw chain 10 via a power transmission mechanism (not illustrated) including a sprocket. The saw chain 10 is driven by the rotor shaft 29. The saw chain 10 is driven by the rotation of the rotor shaft 29.

The cooling fan 20 is disposed outside the motor case 13A. The cooling fan 20 faces at least a part of the outer surface of the motor case 13A. The cooling fan 20 is fixed to the rotor shaft 29. The cooling fan 20 is rotated by the rotor shaft 29.

In the present embodiment, the cooling fan 20 is disposed leftward relative to the motor case 13A. The cooling fan 20 is fixed to the left end portion of the rotor shaft 29 disposed outside the motor case 13A. The cooling fan 20 faces at least a part of the outer surface of the motor case 13A. In the present embodiment, the cooling fan 20 is disposed so as to face at least a part of the lid 62A.

In the present embodiment, the cooling fan 20 is a centrifugal fan. The cooling fan 20 includes: a suction port 20A provided at a left end portion of the cooling fan 20; and a blow-out port 20F provided at a peripheral edge portion of the cooling fan 20. The cooling fan 20 generates an air flow for cooling the motor case 13A. When the rotor shaft 29 rotates, the cooling fan 20 rotates together with the rotor shaft 29. When the cooling fan 20 rotates, air around the cooling fan 20 is sucked into the suction port 20A. The air sucked into the suction port 20A is blown out from the blow-out port 20F. At least a part of the air blown out from the blow-out port 20F hits the outer surface of the motor case 13A. This cools the motor case 13A.

In the present embodiment, the cooling fan 20 is fixed to the rotor shaft 29 via a fan bush 73. The fan bush 73 is an intermediate member connecting the rotor shaft 29 and the cooling fan 20. The fan bush 73 is disposed outside the motor case 13A so as to connect the left end portion of the rotor shaft 29 and the cooling fan 20. When the cooling fan 20 rotates, the fan bush 73 rotates together with the cooling fan 20.

The sensor board 22 supports magnetic sensors 74. The sensor board 22 is disposed in an internal space of the motor case 13A. The sensor board 22 has an annular shape. The sensor board 22 is disposed around the rotor shaft 29. The sensor board 22 includes a circuit board 22A on which magnetic sensors 74 are mounted, and a resin film 22B covering at least a part of surfaces of the magnetic sensor 74 and the circuit board 22A. The circuit board 22A includes a printed wiring board (PWB). As a material for forming the circuit board 22A, an epoxy resin is exemplified. The circuit board 22A may be made of a metal such as aluminum, or may be made of a heat dissipation resin having a higher thermal conductivity than an epoxy resin. The resin film 22B functions as a heat insulating film.

In the axial direction, the sensor board 22 is disposed between the lid 62A and the stator 27. The sensor board 22 is fixed to the motor case 13A. The sensor board 22 is fixed to the lid 62A by substrate screws 78.

The magnetic sensors 74 detect the rotor magnets 55. The magnetic sensors 74 are supported by the sensor board 22 so as to face the rotor magnets 55. A Hall element is exemplified as the magnetic sensor 74. The magnetic sensors 74 detect the rotation of the rotor 28 by detecting the rotor magnets 55. Signal lines 75 are connected to the sensor board 22. Five of the signal lines 75 are disposed. Detection signals of the magnetic sensors 74 are transmitted to the controller 6 via the signal lines 75.

The seal members 25 seal a boundary between the rotor shaft 29 and the motor case 13A. The seal member 25 includes an oil seal. The seal members 25 are disposed in the shaft holes 72. The seal members 25 are press-fitted between the rotor shaft 29 and the peripheral wall portions 101. The seal members 25 are supported by the peripheral wall portions 101. The seal members 25 include a seal member 25L that seals a boundary between the left portion of the rotor shaft 29 and the motor case 13A, and a seal member 25R that seals a boundary between the right portion of the rotor shaft 29 and the motor case 13A. The seal member 25L is disposed in the shaft hole 72L. The seal member 25R is disposed in the shaft hole 72R.

A stopper member 108L is disposed on the left side of the seal member 25L. A stopper member 108R is disposed on the right side of the seal member 25R. The stopper member 108L prevents the leakage of the seal member 25L from the shaft hole 72L. The stopper member 108R prevents the leakage of the seal member 25R from the shaft hole 72R. A circlip is exemplified as the stopper member 108L and the stopper member 108R.

The seal member 26 seals a boundary between the main body 60A and the lid 62A. The seal member 26 includes an O-ring. The seal member 26 is disposed so as to surround the insertion opening 63. A left end portion of the main body 60A is disposed so as to face an inner surface (right surface) of the lid 62A. A recess 109 is formed at the left end portion of the main body 60A. The recess 109 is formed so as to surround the insertion opening 63. The seal member 26 is disposed in the recess 109.

The seal member 23 is disposed in the wiring passage 79 while holding the power supply lines 46. The seal member 23 seals a boundary between each of the power supply lines 46 and the main body 60A. The seal member 23 has a substantially cylindrical shape. The seal member 23 is made of rubber. The seal member 23 has holes in which the power supply lines 46 are disposed. Three holes are provided. The three holes are provided in parallel to each other. There are three power supply lines 46. The three power supply lines 46 are respectively disposed in the three holes. The outer surface of each of the power supply lines 46 and the inner surface of the hole are in close contact with each other.

The seal member 23 is fixed to the motor case 13A by a fixing member 92 in a state of being disposed in the wiring passage 79. The fixing member 92 includes a peripheral wall portion 95 covering the seal member 23 and a fixing portion 96 fixed to the motor case 13A. When the fixing portion 96 is fixed to the motor case 13A by screws 99 with the peripheral wall portion 95 covering the seal member 23, the fixing member 92 moves rearward so as to approach the motor case 13A. Accordingly, the seal member 23 is fixed to the motor case 13A.

The resin portion 19 of the motor assembly 11A is made of a synthetic resin. The resin portion 19 is accommodated in the motor case 13A. The resin portion 19 is disposed in the internal space of the motor case 13A. The resin portion 19 is disposed so as to cover at least the coils 32 in the internal space of the motor case 13A. In the present embodiment, the resin portion 19 is disposed so as to cover each of the stator core 30 and the insulator 31 in the internal space of the motor case 13A. Furthermore, the resin portion 19 is disposed in the internal space of the motor case 13A so as to cover the bus bar unit 33 and the bus bar screws 53.

As illustrated in FIGS. 4, 6, and 8, the resin portion 19 includes a first portion 191 and a second portion 192 disposed leftward relative to the first portion 191. The first portion 191 is disposed closer to the insertion opening (opening) 63 than the second portion 192 is. The second portion 192 is disposed closer to the lid 62A than the first portion is and disposed radially outward relative to the first portion 191. Each of the first portion 191 and the second portion 192 has a tubular shape. A recess 190 is provided at the center of the left surface of the resin portion 19. The recess 190 is formed so as to be recessed rightward from the left surface of the resin portion 19. The first portion 191 is a portion of the resin portion 19 and is disposed rightward relative to the recess 190. The second portion 192 is a portion of the resin portion 19 and is disposed radially outward relative to the recess 190. The first portion 191 and the second portion 192 are integrated.

As illustrated in FIG. 4, a second inner diameter Di2 indicating an inner diameter of the second portion 192 is larger than a first inner diameter Di1 indicating an inner diameter of the first portion 191.

A second outer diameter Do2 indicating an outer diameter of the second portion 192 is larger than a first outer diameter Do1 indicating an outer diameter of the first portion 191.

The first inner diameter Di1 is substantially equal to the inner diameter of the stator core 30. The inner diameter of the stator core 30 is the inner diameter of the inner-circumferential surface of the teeth 35. The inner-circumferential surface of the teeth 35 is the most radially inner portion of the teeth 35. The first outer diameter Do1 is substantially equal to the outer diameter of the stator core 30.

The first portion 191 covers the coils 32. The first portion 191 covers at least a part of the stator core 30. The first portion 191 covers at least a part of the insulator 31. The first portion 191 may or may not cover the inner-circumferential surfaces of the teeth 35.

The second portion 192 covers a part of the insulator 31. The second portion 192 covers the bus bar unit 33. The second portion 192 covers the bus bar screws 53.

The resin portion 19 is disposed so as to be in contact with the inner surface of the motor case 13A. The resin portion 19 is disposed so as to be in contact with each of the inner surface of the main body 60A and the inner surface (right surface) of the lid 62A.

In the present embodiment, at least a part of the first portion 191 is in contact with the inner surface of the main body 60A. At least a part of the second portion 192 is in contact with the inner surface of the main body 60A. At least a part of the second portion 192 is in contact with the inner surface of the lid 62A.

The sensor board 22 is disposed inside the recess 190. The sensor board 22 is disposed radially inside the second portion 192. The substrate screws 78 are also disposed radially inward of the second portion 192. The sensor board 22 and the resin portion 19 are separated from each other.

As illustrated in FIG. 6, the sensor board 22 has an outer-circumferential surface 220 facing radially outward, a first surface 221 facing rightward, and a second surface 222 facing leftward. At least a part of the first surface 221 includes a plane orthogonal to the rotation axis AX. The second surface 222 faces the opposite side of the first surface 221. At least a part of the second surface 222 includes a plane orthogonal to the rotation axis AX. At least a part of the first surface 221 of the sensor board 22 faces an end surface 281 of the rotor 28 facing leftward. The end surface 281 of the rotor 28 includes an end surface of the rotor core 54 facing leftward and an end surface of the rotor magnet 55 facing leftward. The end surface 281 includes a plane orthogonal to the rotation axis AX.

The peripheral edge region of the first surface 221 faces an end surface 193 of the first portion 191 facing leftward. The end surface 193 includes a plane orthogonal to the rotation axis AX.

The second surface 222 of the sensor board 22 faces the inner surface of the lid 62A facing rightward.

The outer-circumferential surface 220 of the sensor board 22 is disposed so as to connect the radially outer end portion of the first surface 221 and the radially outer end portion of the second surface 222. The outer-circumferential surface 220 of the sensor board 22 faces an inner-circumferential surface 194 of the second portion 192 facing radially inward. At least a part of the inner-circumferential surface 194 is parallel to the rotation axis AX. The right end portion of the inner-circumferential surface 194 and the radially outer end portion of the end surface 193 are connected to each other.

The resin portion 19 has high thermal conductivity and electrical insulation. For example, when the insulator 31 is made of a nylon resin and the thermal conductivity of the nylon resin is 0.2 (W/m·K), the thermal conductivity of the synthetic resin used for the resin portion 19 is higher than 0.2 (W/m·K).

Examples of the insulating synthetic resin having a thermal conductivity of more than 0.2 (W/m·K) include unsaturated polyester resins. Alternatively, the resin portion 19 may be made of a nylon resin containing an insulating thermally conductive filler.

After the stator 27 is inserted into the main body 60A through the insertion opening 63, a mold is inserted into the main body 60A. After the mold is inserted into the main body 60A, the heated and melted synthetic resin is supplied to the mold through the insertion opening c. The mold is disposed inside the main body 60A such that the first portion 191 and the second portion 192 are formed in the resin portion 19. The resin portion 19 is formed inside the main body 60A by solidifying the synthetic resin supplied to the inside of the main body 60A. After the stator 27 and the resin portion 19 are arranged inside the main body 60A, the rotor 28 is inserted inside the main body 60A via the insertion opening 63. After the rotor 28 is disposed inside the main body 60A, the lid 62A to which the sensor board 22 is fixed and the main body 60A are fixed by screws 71.

The thermal conducting material (TIM) 80 is disposed between the lid 62A and the resin portion 19. The thermal conductivity of the thermal conducting material 80 is higher than the thermal conductivity of the insulator 31. The thermal conductivity of the thermal conducting material 80 is higher than the thermal conductivity of the resin portion 19. The thermal conducting material 80 is electrically insulating.

The thermal conducting material 80 is in contact with both the lid 62A and the resin portion 19. The thermal conducting material 80 may be a coating film applied to one or both of the lid 62A and the resin portion 19, or may be a solid sheet-like member. In the present embodiment, the thermal conducting material 80 includes a thermal conductive sheet. In the following description, the thermal conducting material 80 is appropriately referred to as a thermal conductive sheet 80.

As illustrated in FIG. 7, the thermal conductive sheet 80 has a left surface 80A in contact with the inner surface (right surface) of the lid 62A, and a right surface 80B in contact with the left end surface of the resin portion 19. The thermal conductive sheet 80 is disposed, in a compressed state, between the lid 62A and the resin portion 19. The thermal conductive sheet 80 may be elastically deformed or plastically deformed. When the thermal conductive sheet 80 is disposed, in a compressed state, between the lid 62A and the resin portion 19; the left surface 80A is in close contact with the inner surface of the lid 62A, and the right surface 80B is in close contact with the left end surface of the resin portion 19.

In the present embodiment, the thermal conductive sheet 80 is disposed between the inner surface of the lid 62A and the left end surface of the second portion 192 of the resin portion 19. As illustrated in FIGS. 4 and 8, the thermal conductive sheet 80 has an annular shape. The thermal conductive sheet 80 is disposed so as to surround the rotation axis AX.

As illustrated in FIG. 7, the lid 62A includes a contact region 623 and a connection region 624.

The contact region 623 is a partial region of the inner surface of the lid 62A facing the internal space of the motor case 13A. The contact region 623 faces rightward. The contact region 623 is in contact with the left surface 80A of the thermal conductive sheet 80.

The connection region 624 is disposed radially outward relative to the contact region 623. The connection region 624 faces the same direction as the contact region 623. That is, the connection region 624 faces rightward. The connection region 624 faces the left end portion of the main body 60A. The left end portion of the main body 60A is disposed around the insertion opening 63 and includes a peripheral edge region 604 of the main body 60A facing leftward. The connection region 624 is connected to the peripheral edge region 604.

In the present embodiment, the contact region 623 is disposed leftward relative to the connection region 624.

The recess 109 is formed in the peripheral edge region 604. The seal member 26 is disposed in the recess 109 formed in the peripheral edge region 604. The seal member 26 seals a boundary between the peripheral edge region 604 of the main body 60A and the connection region 624 of the lid 62A. The seal member 26 is disposed, in a compressed state, between the main body 60A and the lid 62A. The seal member 26 is in close contact with each of the main body 60A and the lid 62A.

After the stator 27 is inserted into the main body 60A through the insertion opening 63, the mold is inserted into the main body 60A. After the mold is inserted into the main body 60A, the heated and melted synthetic resin is supplied to the mold through the insertion opening 63. The mold is disposed inside the main body 60A such that the first portion 191 and the second portion 192 are formed in the resin portion 19. The resin portion 19 is formed inside the main body 60A by solidifying the synthetic resin supplied to the inside of the main body 60A. After the stator 27 and the resin portion 19 are arranged inside the main body 60A, the rotor 28 is inserted inside the main body 60A via the insertion opening 63. Furthermore, after the resin portion 19 is disposed inside the main body 60A, the thermal conductive sheet 80 is disposed on the left end surface of the resin portion 19. Furthermore, the seal member 26 is disposed in the recess 109 of the main body 60A. After the rotor 28 is disposed inside the main body 60A, the thermal conductive sheet 80 is disposed on the left end surface of the resin portion 19, and the seal member 26 is disposed in the recess 109 of the main body 60A, the lid 62A to which the sensor board 22 is fixed and the main body 60A are fixed by the screws 71. By fixing the lid 62A and the main body 60A with the screws 71, the thermal conductive sheet 80 is disposed, in a compressed state, between the lid 62A and the resin portion 19. The seal member 26 is disposed, in a compressed state, between the main body 60A and the lid 62A.

The seal member 26 prevents foreign matters around the motor case 13A from entering the internal space of the motor case 13A. The foreign matters around the motor case 13A include dust and moisture. The seal member 26 is disposed, in a compressed state, between the main body 60A and the lid 62A. Since the seal member 26 is in close contact with each of the main body 60A and the lid 62A, entry of foreign matters around the motor case 13A into the internal space of the motor case 13A is suppressed.

The thermal conductive sheet 80 is disposed, in a compressed state, between the resin portion 19 and the lid 62A. Since the thermal conductive sheet 80 is in close contact with each of the resin portion 19 and the lid 62A, the heat of the coils 32 is efficiently transmitted to the lid 62A via the resin portion 19 and the thermal conductive sheet 80. The heat of the coils 32 transmitted to the lid 62A is dissipated from the lid 62A to the periphery of the motor case 13A.

When the peripheral edge region 604 and the connection region 624 are brought into contact with each other so that the seal member 26 is compressed, there is a possibility that a gap is formed between the left end surface of the resin portion 19 and the inner surface of the lid 62A due to, for example, a dimensional error of the resin portion 19. Furthermore, when the left end surface of the resin portion 19 and the inner surface of the lid 62A are brought into contact with each other, a gap is formed between the peripheral edge region 604 and the connection region 624, and there is a possibility that the seal member 26 is not compressed.

In the present embodiment, when the peripheral edge region 604 and the connection region 624 are brought into contact with each other so that the seal member 26 is compressed, the resin portion 19 is formed such that a gap is formed between the left end surface of the resin portion 19 and the inner surface of the lid 62A. A thickness of the thermal conductive sheet 80 before being compressed is larger than the dimension of the gap between the left end surface of the resin portion 19 and the inner surface of the lid 62A. Furthermore, the thermal conductive sheet 80 can be subjected to compressive deformation (elastic deformation or plastic deformation). Therefore, when the peripheral edge region 604 and the connection region 624 are brought into contact with each other so that the seal member 26 is compressed, the thermal conductive sheet 80 is disposed between the left end surface of the resin portion 19 and the inner surface of the lid 62A in a state of being compressed by the lid 62A and the resin portion 19. The thermal conductive sheet 80 is in close contact with each of the left end surface of the resin portion 19 and the contact region 623 of the lid 62A. As a result, the heat of the coils 32 is efficiently transferred to the lid 62A via the resin portion 19 and the thermal conductive sheet 80.

Effects

As described above, in the embodiment, the electric work machine 1 includes: the motor 12; the saw chain 10 which is an output unit; the motor case 13A; and the resin portion 19. The motor 12 includes: a stator 27 including coils 32; a rotor 28 that is rotatable with respect to the stator 27; and a rotor shaft 29 fixed to the rotor 28. The saw chain 10 is driven by the rotor shaft 29. The stator 27 and the rotor 28 are accommodated in the motor case 13A. The motor case 13A includes: a main body 60A having the insertion opening 63; and a lid 62A disposed on one side (on the left side or leftward) in the axial direction relative to the main body 60A and connected to the main body 60A so as to close the insertion opening 63. The resin portion 19 is accommodated in the motor case 13A. The resin portion 19 includes a first portion 191 covering the coils 32 and a second portion 192 disposed on one side (on the left side or leftward) in the axial direction relative to the first portion 191. The first portion 191 and the second portion 192 are integrated. Each of the first portion 191 and the second portion 192 has a tubular shape. A second inner diameter Di2 indicating the inner diameter of the second portion 192 is larger than a first inner diameter Di1 indicating the inner diameter of the first portion 191.

In the above-mentioned configuration, the heat of the coils 32 is dissipated through the resin portion 19. The coils 32 are covered with the first portion 191 of the resin portion 19. A second inner diameter Di2 of the second portion 192 disposed on the one side in the axial direction relative to the first portion 191 is larger than a first inner diameter Di1 of the first portion 191. Therefore, an increase in the weight of the resin portion 19 is suppressed. By suppressing an increase in the weight of the resin portion 19, an increase in the weight of the motor assembly 11A is suppressed. Since the increase in the weight of the motor assembly 11A is suppressed, the increase in the weight of the electric work machine 1 is suppressed.

In the embodiment, the electric work machine 1 includes the sensor board 22 that supports the magnetic sensors 74 that detect the rotation of the rotor 28. The sensor board 22 is disposed radially inside the second portion 192.

In the above-mentioned configuration, since the second inner diameter Di2 of the second portion 192 is larger than the first inner diameter Di1 of the first portion 191, the narrowing of the space on the radially inner side of the second portion 192 is suppressed. When the space in which the sensor board 22 is disposed is small, it is necessary to downsize the sensor board 22. When the sensor board 22 is downsized, there is a possibility that the size, position, number, and the like of electronic components mounted on the sensor board 22 are restricted, or the degree of difficulty in mounting is increased. Since the narrowing of the space in which the sensor board 22 is disposed is suppressed, the sensor board 22 does not need to be downsized.

In the embodiment, the sensor board 22 is fixed to the lid 62A in the internal space of the motor case 13A.

In the above-mentioned configuration, the stator 27 is inserted inside the main body 60A via the insertion opening 63, and after at least a part of the stator 27 is covered with the resin portion 19, the rotor 28 is inserted inside the main body 60A. After the stator 27, the resin portion 19, and the rotor 28 are arranged inside the main body 60A, the lid 62A to which the sensor board 22 is fixed and the main body 60A are connected. As a result, each of the stator 27, the resin portion 19, the rotor 28, and the sensor board 22 is appropriately accommodated in the motor case 13A.

In the embodiment, the electric work machine 1 includes a substrate screw 78 that fixes the sensor board 22 to the lid 62A. The substrate screw 78 is disposed radially inside the second portion 192.

In the above-mentioned configuration, since the narrowing of the space in which the sensor board 22 and the substrate screw 78 are disposed is suppressed, the substrate screw 78 can appropriately fix the sensor board 22 and the lid 62A.

In the embodiment, at least a part of the first surface 221 of the sensor board 22 faces the end surface 281 of the rotor 28 facing one side (left side) in the axial direction.

In the above-mentioned configuration, the magnetic sensor 74 of the sensor board 22 can appropriately detect the rotation of the rotor 28.

In the embodiment, the second surface 222 of the sensor board 22 facing the opposite side of the first surface 221 faces the lid 62A.

In the above-mentioned configuration, an increase in size of the motor case 13A is suppressed.

In the embodiment, the peripheral edge region of the first surface 221 faces the end surface 193 of the first portion 191 facing one side (left side) in the axial direction.

In the above-mentioned configuration, downsizing of the sensor board 22 is suppressed.

In the embodiment, the outer-circumferential surface 220 of the sensor board 22 faces the inner-circumferential surface 194 of the second portion 192 facing radially inward.

In the above-mentioned configuration, an increase in size of the motor case 13A is suppressed.

In the embodiment, the sensor board 22 and the resin portion 19 are separated from each other.

In the above-mentioned configuration, the heat of the coils 32 is suppressed from being transmitted to the sensor board 22 via the resin portion 19.

In the embodiment, at least a part of the second portion 192 is in contact with the lid 62A.

In the above-mentioned configuration, the heat of the coils 32 is transmitted to the lid 62A via the first portion 191 and the second portion 192 of the resin portion 19. The heat of the coils 32 transmitted to the lid 62A is dissipated to the space around the motor case 13A.

In the embodiment, the second outer diameter Do2 indicating the outer diameter of the second portion 192 is larger than the first outer diameter Do1 indicating the outer diameter of the first portion 191.

In the above-mentioned configuration, for example, the bus bar unit 33 of the motor 12 is appropriately covered with the second portion 192 of the resin portion 19. The resin portion 19 has not only a heat transfer function but also a waterproof function. Therefore, for example, the bus bar unit 33 is covered with the second portion 192 of the resin portion 19, whereby the bus bar unit 33 is waterproofed. Furthermore, since the second outer diameter Do2 of the second portion 192 is larger than the first outer diameter Do1 of the first portion 191, the second portion 192 can cover not only the bus bar unit 33 but also various parts of the motor assembly 11A accommodated in the motor case 13A.

In the embodiment, at least a part of the second portion 192 is in contact with the main body 60A.

In the above-mentioned configuration, the heat of the coils 32 is transmitted to the main body 60A via the first portion 191 and the second portion 192 of the resin portion 19. The heat of the coils 32 transmitted to the main body 60A is dissipated to the space around the motor case 13A.

In the embodiment, at least a part of the first portion 191 is in contact with the main body 60A.

In the above-mentioned configuration, the heat of the coils 32 is transmitted to the main body 60A via the first portion 191 of the resin portion 19. The heat of the coils 32 transmitted to the main body 60A is dissipated to the space around the motor case 13A.

In the embodiment, the stator 27 includes a stator core 30 having teeth 35 and an insulator 31 fixed to the stator core 30. The coils 32 are respectively wound around the teeth 35 via the insulator 31. The first portion 191 covers at least a part of the stator core 30 and the insulator 31.

In the above-mentioned configuration, not only the coils 32 but also at least a part of the stator core 30 and the insulator 31 are covered with the first portion 191 of the resin portion 19. As a result, the stator core 30 and the insulator 31 are protected by the resin portion 19. Furthermore, as described above, the resin portion 19 has not only a heat transfer function but also a waterproof function. Therefore, the stator core 30 and the insulator 31 are waterproofed.

In the embodiment, the first inner diameter Di1 is substantially equal to the inner diameter of the stator core 30.

In the above-mentioned configuration, an unnecessary increase in the volume of the first portion 191 is suppressed.

In the embodiment, the electric work machine 1 includes the bus bar unit 33 including the short-circuit member 44 that connects the pair of coils 32 and the insulating member 45 that covers the short-circuit member 44. The second portion 192 covers the bus bar unit 33.

In the above-mentioned configuration, the bus bar unit 33 is protected by the resin portion 19. Furthermore, the bus bar unit 33 is waterproofed by the resin portion 19.

In the embodiment, the bus bar unit 33 has external terminals 42 connected to the power supply lines 46. The drive currents for the coils 32 are supplied to the coils 32 via the power supply lines 46, the external terminals 42, and the short-circuit members 44.

In the above-mentioned configuration, the external terminal 42 of the bus bar unit 33 is waterproofed by the resin portion 19.

In the embodiment, the bus bar unit 33 is fixed to the insulator 31.

In the above-mentioned configuration, a change in the relative position between the bus bar unit 33 and the insulator 31 is suppressed.

In the embodiment, the electric work machine 1 includes a bus bar screw 53 that fixes the bus bar unit 33 to the insulator 31. The second portion 192 covers the bus bar screw 53.

In the above-mentioned configuration, the bus bar screw 53 is protected by the resin portion 19.

In the embodiment, the electric work machine 1 includes the seal member 26 that seals the boundary between the main body 60A and the lid 62A.

In the above-mentioned configuration, the foreign matter around the motor case 13A is suppressed from entering the internal space of the motor case 13A. The foreign matter around the motor case 13A includes dust and moisture.

In the embodiment, the electric work machine 1 includes a motor 12, a saw chain 10 which is an output unit, a motor case 13A, a resin portion 19, a seal member 26, and a thermal conductive sheet 80 which is a thermal conducting material. The motor 12 includes: a stator 27 including coils 32; a rotor 28 that is rotatable with respect to the stator 27; and a rotor shaft 29 fixed to the rotor 28. The saw chain 10 is driven by the rotor shaft 29. The motor case 13A includes: a main body 60A having the insertion opening 63; and a lid 62A disposed on one side (on the left side or leftward) in the axial direction relative to the main body 60A and connected to the main body 60A so as to close the insertion opening 63. The stator 27 and the rotor 28 are accommodated in the motor case 13A. The resin portion 19 covers the coils 32. The resin portion 19 is accommodated in the motor case 13A. The seal member 26 seals a boundary between the main body 60A and the lid 62A. The thermal conductive sheet 80 is disposed between the lid 62A and the resin portion 19.

In the above-mentioned configuration, the seal member 26 prevents foreign matter around the motor case 13A from entering the internal space of the motor case 13A. The foreign matter around the motor case 13A includes dust and moisture. By disposing the thermal conductive sheet 80 between the lid 62A and the resin portion 19, the heat of the coils 32 is transmitted to the lid 62A via the resin portion 19 and the thermal conductive sheet 80. The heat of the coils 32 transmitted to the lid 62A is dissipated to the space around the motor case 13A. For example, even when a situation in which a gap between the resin portion 19 and the lid 62A becomes large occurs in a state in which the main body 60A and the lid 62A are connected so that the seal member 26 is compressed due to a dimensional error of the resin portion 19, the gap between the resin portion 19 and the lid 62A is filled with the thermal conductive sheet 80.

In the embodiment, the thermal conductive sheet 80 is in contact with both the lid 62A and the resin portion 19.

In the above-mentioned configuration, the heat of the coils 32 is efficiently transferred to the lid 62A via the resin portion 19 and the thermal conductive sheet 80.

In embodiments, the thermal conducting material includes the thermal conductive sheet 80.

In the above-mentioned configuration, a decrease in workability when the thermal conducting material is disposed between the resin portion 19 and the lid 62A is suppressed.

In the embodiment, the thermal conductive sheet 80 is disposed between the lid 62A and the resin portion 19 in a compressed state.

In the above-mentioned configuration, the thermal conductive sheet 80 can be in close contact with each of the lid 62A and the resin portion 19. Therefore, the heat of the coils 32 is efficiently transmitted to the lid 62A via the resin portion 19 and the thermal conductive sheet 80.

In the embodiment, at least a part of the resin portion 19 is in contact with the main body 60A.

In the above-mentioned configuration, the heat of the coils 32 is efficiently transferred to the main body 60A via the resin portion 19. The heat of the coils 32 transmitted to the main body 60A is dissipated to the space around the motor case 13A.

In the embodiment, the lid 62A includes a contact region 623 in contact with the thermal conductive sheet 80, and a connection region 624 disposed around the insertion opening 63 and connected to a peripheral edge region 604 of the main body 60A facing one side (left side) in the axial direction.

In the above-mentioned configuration, the heat of the coils 32 is efficiently transferred to the lid 62A via the resin portion 19 and the thermal conductive sheet 80, and the main body 60A and the lid 62A are appropriately connected.

In the embodiment, the contact region 623 is disposed on one side (on the left side or leftward) in the axial direction relative to the connection region 624.

In the above-mentioned configuration, a decrease in workability when the main body 60A and the lid 62A are connected is suppressed. Furthermore, an increase in size of the motor case 13A is suppressed.

In the embodiment, the seal member 26 seals a boundary between the peripheral edge region 604 of the main body 60A and the connection region 624 of the lid 62A.

In the above-mentioned configuration, the seal member 26 prevents foreign matter around the motor case 13A from entering the internal space of the motor case 13A.

In the embodiment, the seal member 26 is disposed between the main body 60A and the lid 62A in a compressed state.

In the above-mentioned configuration, the seal member 26 can be in close contact with each of the main body 60A and the lid 62A. Therefore, foreign matter around the motor case 13A is suppressed from entering the internal space of the motor case 13A.

In the embodiment, the resin portion 19 includes a first portion 191 covering the coils 32 and a second portion 192 disposed on one side (on the left side or leftward) in the axial direction relative to the first portion 191. The first portion 191 and the second portion 192 are integrated. Each of the first portion 191 and the second portion 192 has a tubular shape. A second inner diameter Di2 indicating the inner diameter of the second portion 192 is larger than a first inner diameter Di1 indicating the inner diameter of the first portion 191. The thermal conductive sheet 80 is disposed between the lid 62A and the second portion 192.

In the above-mentioned configuration, the second inner diameter Di2 of the second portion 192 disposed on one side (on the left side or leftward) in the axial direction relative to the first portion 191 is larger than the first inner diameter Di1 of the first portion 191. Therefore, an increase in the weight of the resin portion 19 is suppressed. By suppressing an increase in the weight of the resin portion 19, an increase in the weight of the motor assembly 11A is suppressed. Since the increase in the weight of the motor assembly 11A is suppressed, the increase in the weight of the electric work machine 1 is suppressed.

Second Embodiment

A second embodiment will be described. In the following description, the same or equivalent components as those of the above-described embodiment are denoted by the same reference numerals, and the description of the components is simplified or omitted.

Figure 9:
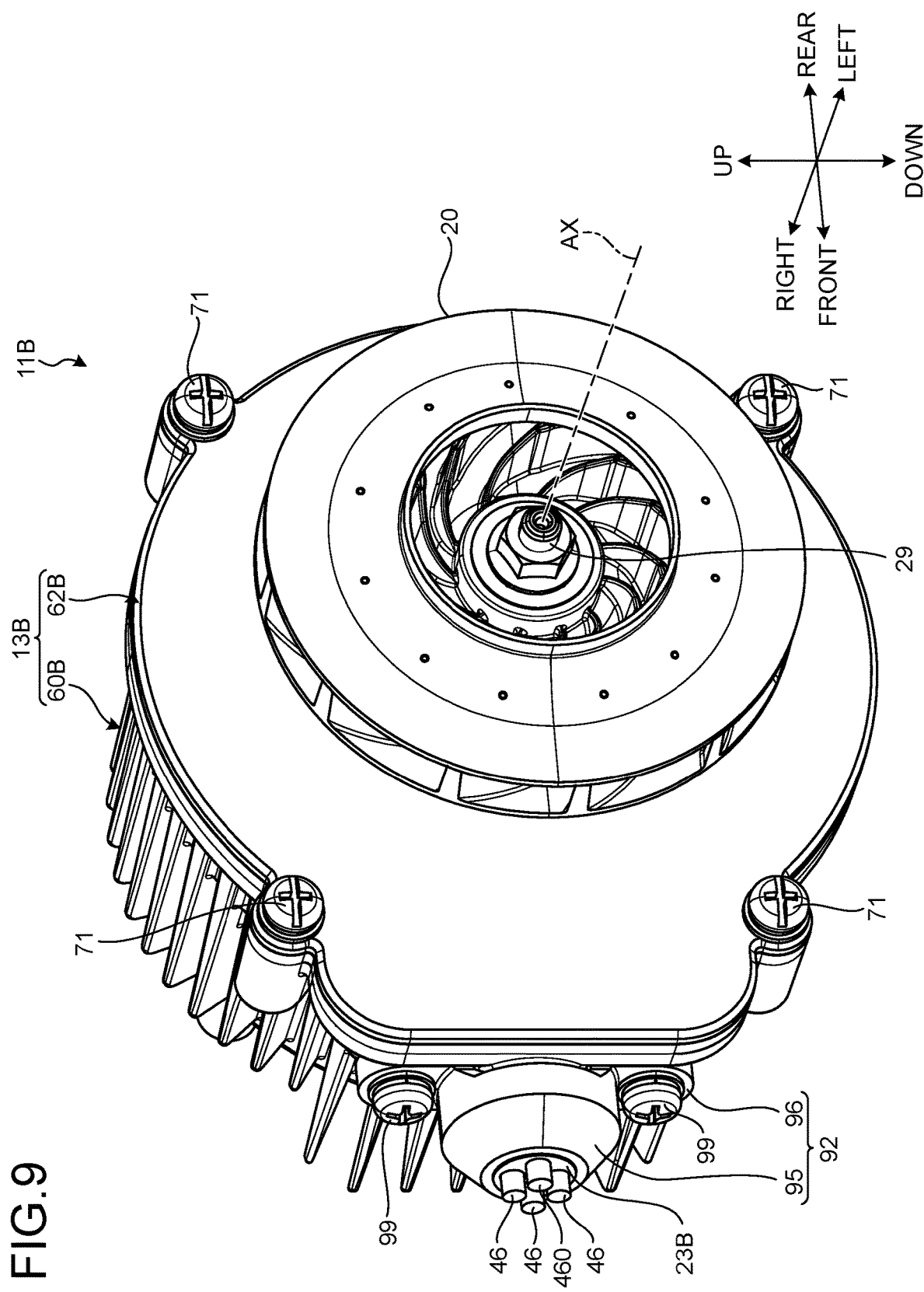
FIG. 9 is an oblique view, viewed from the left, which illustrates a motor assembly according to a second embodiment.
Figure 10:
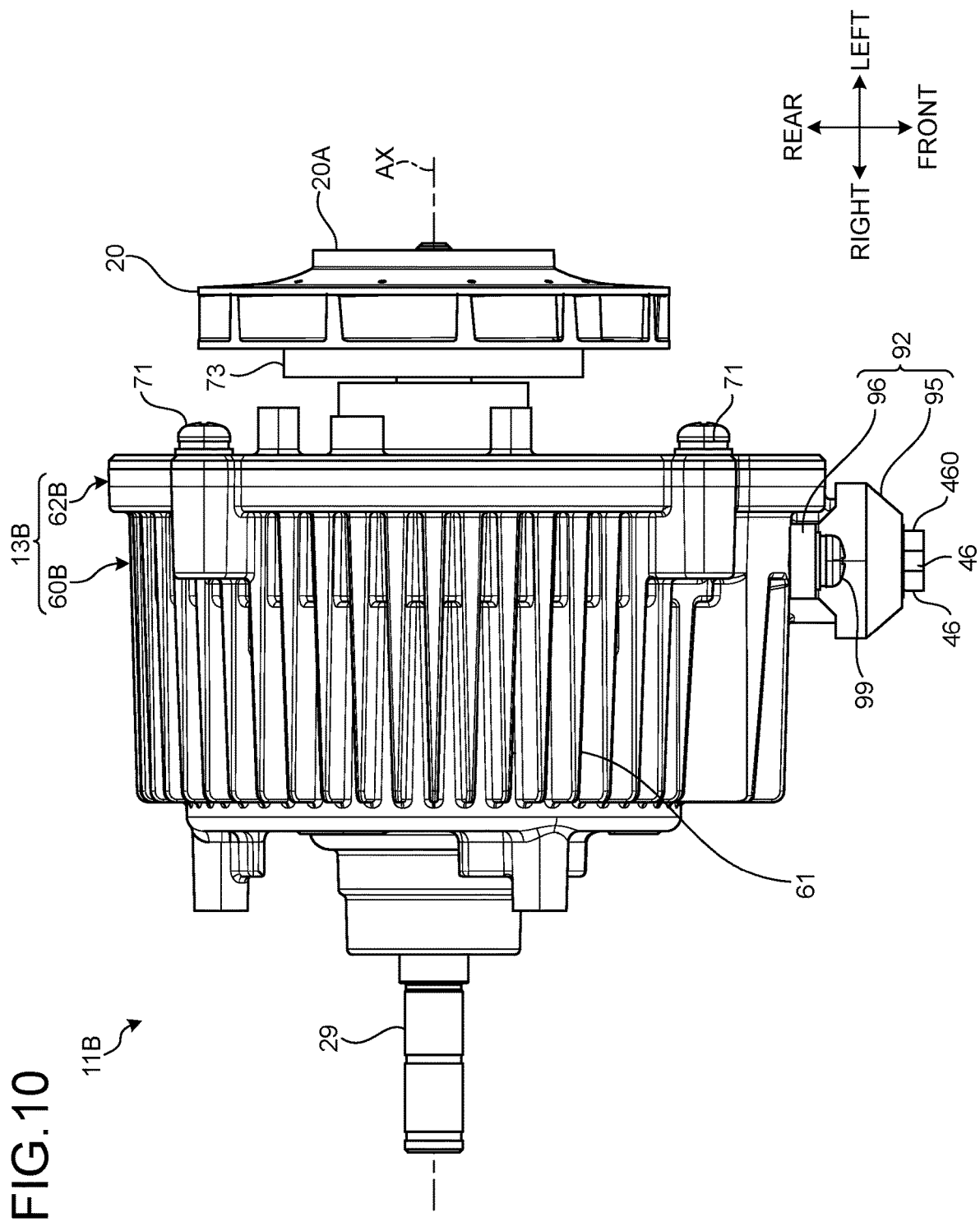
FIG. 10 is a side view illustrating the motor assembly according to the second embodiment.
Figure 11:
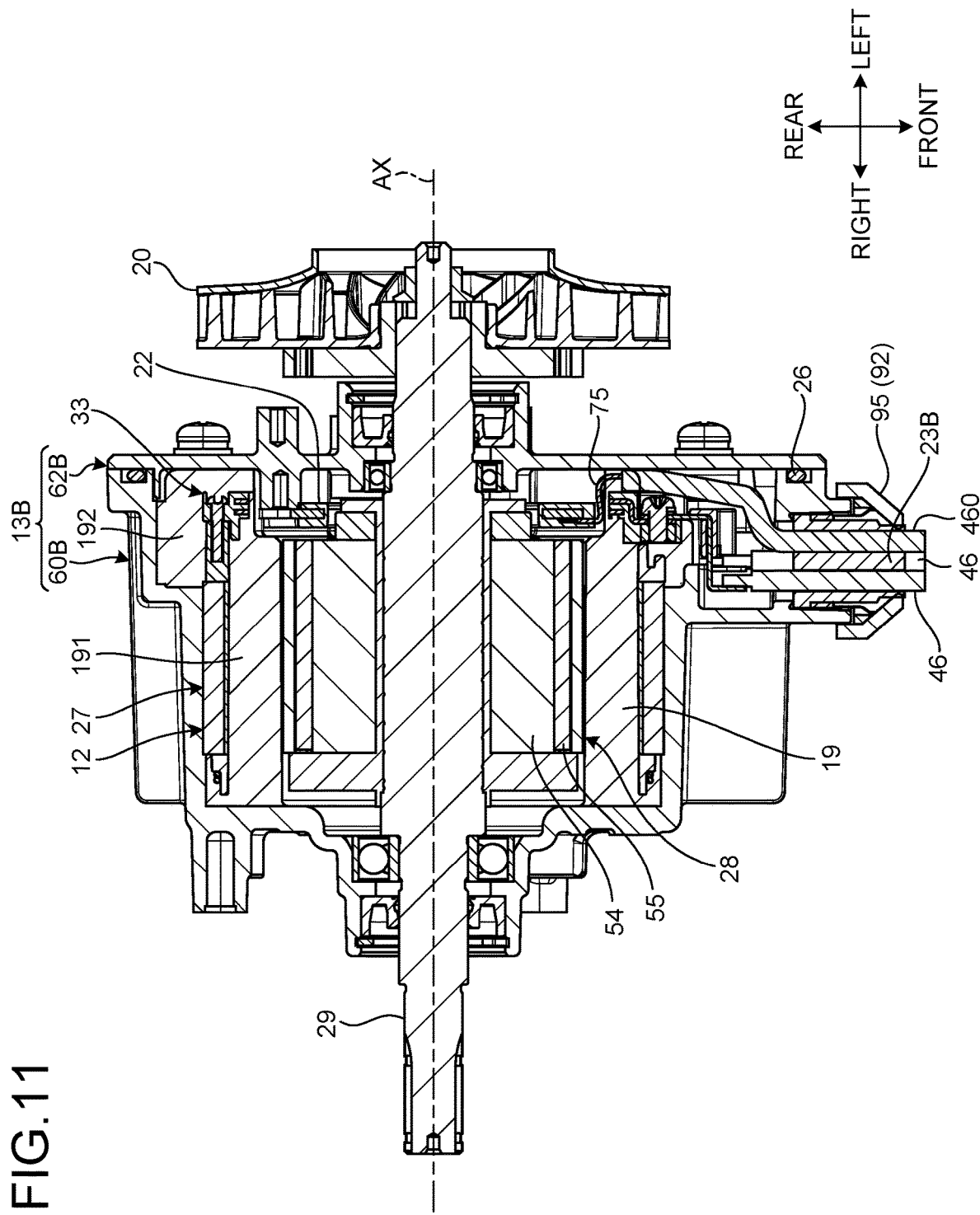
FIG. 11 is a longitudinal sectional view illustrating the motor assembly according to the second embodiment.
Figure 12:
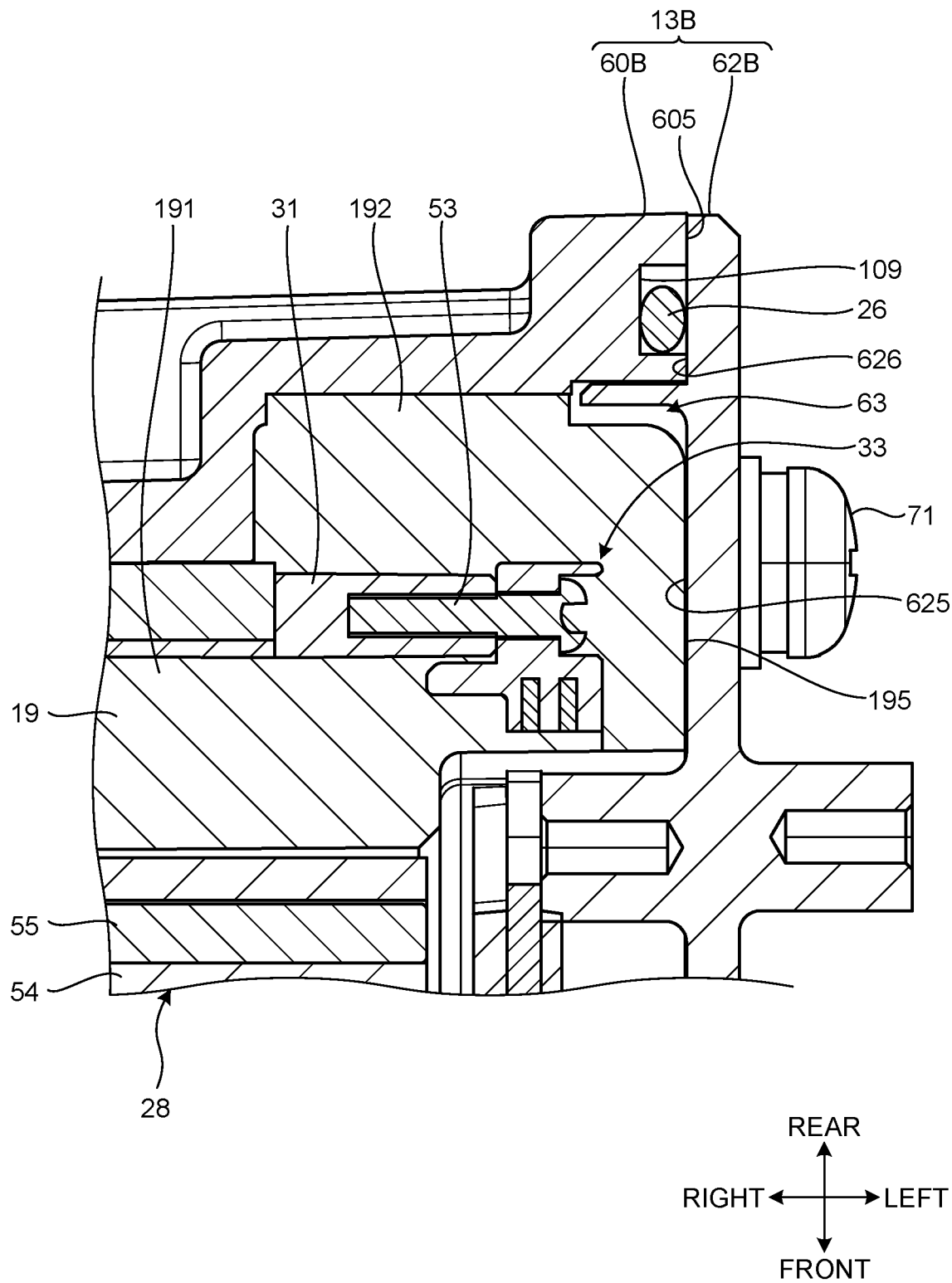
FIG. 12 is an enlarged longitudinal sectional view of a part of the motor assembly according to the second embodiment.

FIG. 9 is an oblique view, viewed from the left, which illustrates a motor assembly 11B according to the present embodiment. FIG. 10 is a side view illustrating the motor assembly 11B according to the present embodiment. FIG. 11 is a longitudinal sectional view illustrating the motor assembly 11B according to the present embodiment. FIG. 12 is an enlarged longitudinal sectional view of a part of the motor assembly 11B according to the present embodiment.

Motor Assembly

The motor assembly 11B includes a motor 12, a motor case 13B, a resin portion 19, and a seal member 26. The motor case 13B includes: a main body 60B having the insertion opening 63; and a lid 62B disposed leftward relative to the main body 60B and connected to the main body 60B so as to close the insertion opening 63. The stator 27 and the rotor 28 are accommodated in the motor case 13B. The resin portion 19 is accommodated in the motor case 13B. As in the above-described embodiment, the resin portion 19 includes: a first portion 191 covering the coils 32; and a second portion 192 disposed leftward relative to the first portion 191. The seal member 26 seals a boundary between the main body 60B and the lid 62B.

In the present embodiment, the motor assembly 11B includes a tube 460 that bundles the five signal lines 75. A seal member 23B has three holes in which the three power supply lines 46 are disposed and one hole in which the tube 460 is disposed. As in the above-described embodiment, the seal member 23B is fixed to the motor case 13B by the fixing member 92.

As illustrated in FIG. 12, the lid 62B includes a contact region 625 and a connection region 626.

The contact region 625 is a partial region of the inner surface of the lid 62B facing the internal space of the motor case 13B. The contact region 625 faces rightward. The contact region 625 is in contact with the left end surface 195 of the resin portion 19. In the present embodiment, the end surface 195 of the resin portion 19 is a left end surface of the second portion 192.

The connection region 626 is disposed radially outward relative to the contact region 625. The connection region 626 faces the same direction as the contact region 625. That is, the connection region 626 faces rightward. The connection region 626 faces the left end portion of the main body 60B. The left end portion of the main body 60B is disposed around the insertion opening 63 and includes a peripheral edge region 605 of the main body 60B facing leftward. The connection region 626 is connected to the peripheral edge region 605.

In the present embodiment, the peripheral edge region 605 of the main body 60B and the end surface 195 of the resin portion 19 facing the contact region 625 are disposed in the same plane. The contact region 625 of the lid 62B and the connection region 626 are disposed in the same plane.

Each of the peripheral edge region 605 and the end surface 195 is a plane orthogonal to the rotation axis AX. In the left-right direction, the position of the peripheral edge region 605 and the position of the end surface 195 are the same.

Each of the contact region 625 and the connection region 626 is a plane orthogonal to the rotation axis AX. In the left-right direction, the position of the contact region 625 and the position of the connection region 626 are the same.

In a state where the end surface 195 of the resin portion 19 and the contact region 625 of the lid 62B are in contact with each other, the peripheral edge region 605 of the main body 60B and the connection region 626 of the lid 62B are in contact with each other.

The recess 109 is formed in the peripheral edge region 605. The seal member 26 is disposed in the recess 109 formed in the peripheral edge region 605. The seal member 26 seals a boundary between the peripheral edge region 605 of the main body 60B and the connection region 626 of the lid 62B. The seal member 26 is disposed, in a compressed state, between the main body 60B and the lid 62B. The seal member 26 is in close contact with each of the main body 60B and the lid 62B.

After the stator 27 is inserted into the main body 60B through the insertion opening 63, at least a part of the mold is inserted into the main body 60B. Furthermore, a part of the mold is disposed so as to be in contact with the peripheral region. After the mold is disposed in the main body 60B, the heated and melted synthetic resin is supplied to the mold. The mold is disposed on the main body 60B such that the first portion 191 and the second portion 192 are formed on the resin portion 19. Furthermore, the mold is disposed on the main body 60B such that the peripheral edge region 605 and the end surface 195 are disposed in the same plane. The resin portion 19 is formed inside the main body 60B by solidifying the synthetic resin supplied to the mold. After the stator 27 and the resin portion 19 are arranged inside the main body 60B, the rotor 28 is inserted inside the main body 60B via the insertion opening 63. Furthermore, the seal member 26 is disposed in the recess 109 of the main body 60B. After the rotor 28 is disposed inside the main body 60B and the seal member 26 is disposed in the recess 109 of the main body 60B, the lid 62B to which the sensor board 22 is fixed and the main body 60B are fixed by the screws 71. By fixing the lid 62B and the main body 60B with the screws 71, the seal member 26 is disposed between the main body 60B and the lid 62B in a compressed state.

Since the seal member 26 is disposed between the main body 60B and the lid 62B in a compressed state, it is in close contact with each of the main body 60B and the lid 62B. Since the seal member 26 is in close contact with each of the main body 60B and the lid 62B, entry of foreign matter around the motor case 13B into the internal space of the motor case 13B is suppressed.

In the present embodiment, the peripheral edge region 605 of the main body 60B and the end surface 195 of the resin portion 19 are disposed in the same plane, and the contact region 625 and the connection region 626 are disposed in the same plane. When the peripheral edge region 604 and the connection region 624 are brought into contact with each other so that the seal member 26 is compressed, the contact region 625 and the end surface 195 are also brought into contact with each other. Since the contact region 625 and the end surface 195 are in contact with each other, the heat of the coils 32 is efficiently transmitted to the lid 62B via the resin portion 19. The heat of the coils 32 transmitted to the lid 62B is dissipated from the lid 62B to the periphery of the motor case 13B.

Effects

As described above, in the embodiment, the lid 62B includes: the contact region 625 that comes into contact with the resin portion 19; and the connection region 626 that is disposed around the insertion opening 63 and is connected to the peripheral edge region 605 of the main body 60B facing one side (left side) in the axial direction. The peripheral edge region 605 of the main body 60B and the end surface 195 of the resin portion 19 facing the contact region 625 are disposed in the same plane. The contact region 625 and the connection region 626 are disposed in the same plane.

In the above-mentioned configuration, since the lid 62B has the contact region 625 in contact with the resin portion 19, the heat of the coils 32 is efficiently transmitted to the lid 62B via the resin portion 19. The heat of the coils 32 transmitted to the lid 62B is dissipated to the space around the motor case 13B. Since the peripheral edge region 605 of the main body 60B and the end surface 195 of the resin portion 19 are arranged in the same plane, and the contact region 625 of the lid 62B and the connection region 626 are arranged in the same plane, it is possible to suppress an increase in the gap between the resin portion 19 and the lid 62B in a state where the main body 60B and the lid 62B are connected so that the seal member 26 is compressed.

In the embodiment, in a state where the end surface 195 of the resin portion 19 and the contact region 625 of the lid 62B are in contact with each other, the peripheral edge region 605 of the main body 60B and the connection region 626 of the lid 62B are in contact with each other.

In the above-mentioned configuration, the heat of the coils 32 is efficiently transmitted to the lid 62B via the resin portion 19, and the main body 60B and the lid 62B are appropriately connected.

In the embodiment, the seal member 26 seals a boundary between the peripheral edge region 605 of the main body 60B and the connection region 626 of the lid 62B.

In the above-mentioned configuration, the seal member 26 prevents foreign matter around the motor case 13B from entering the internal space of the motor case 13B.

In the embodiment, the seal member 26 is disposed, in a compressed state, between the main body 60B and the lid 62B.

In the above-mentioned configuration, the seal member 26 can be in close contact with each of the main body 60B and the lid 62B. Therefore, foreign matter around the motor case 13B is suppressed from entering the internal space of the motor case 13B.

In the embodiment, at least a part of the resin portion 19 is in contact with the main body 60B.

In the above-mentioned configuration, the heat of the coils 32 is efficiently transferred to the main body 60B via the resin portion 19. The heat of the coils 32 transmitted to the main body 60B is dissipated to the space around the motor case 13B.

In the embodiment, the resin portion 19 includes: a first portion 191 covering the coils 32; and a second portion 192 disposed on one side (on the left side or leftward) in the axial direction relative to the first portion 191.

In the above-mentioned configuration, an increase in the weight of the resin portion 19 is suppressed. By suppressing an increase in the weight of the resin portion 19, an increase in the weight of the motor assembly 11B is suppressed. By suppressing an increase in the weight of the motor assembly 11B, an increase in the weight of the electric work machine 1 is suppressed.

Third Embodiment

A third embodiment will be described. In the following description, the same or equivalent components as those of the above-described embodiment are denoted by the same reference numerals, and the description of the components is simplified or omitted.

Figure 13:
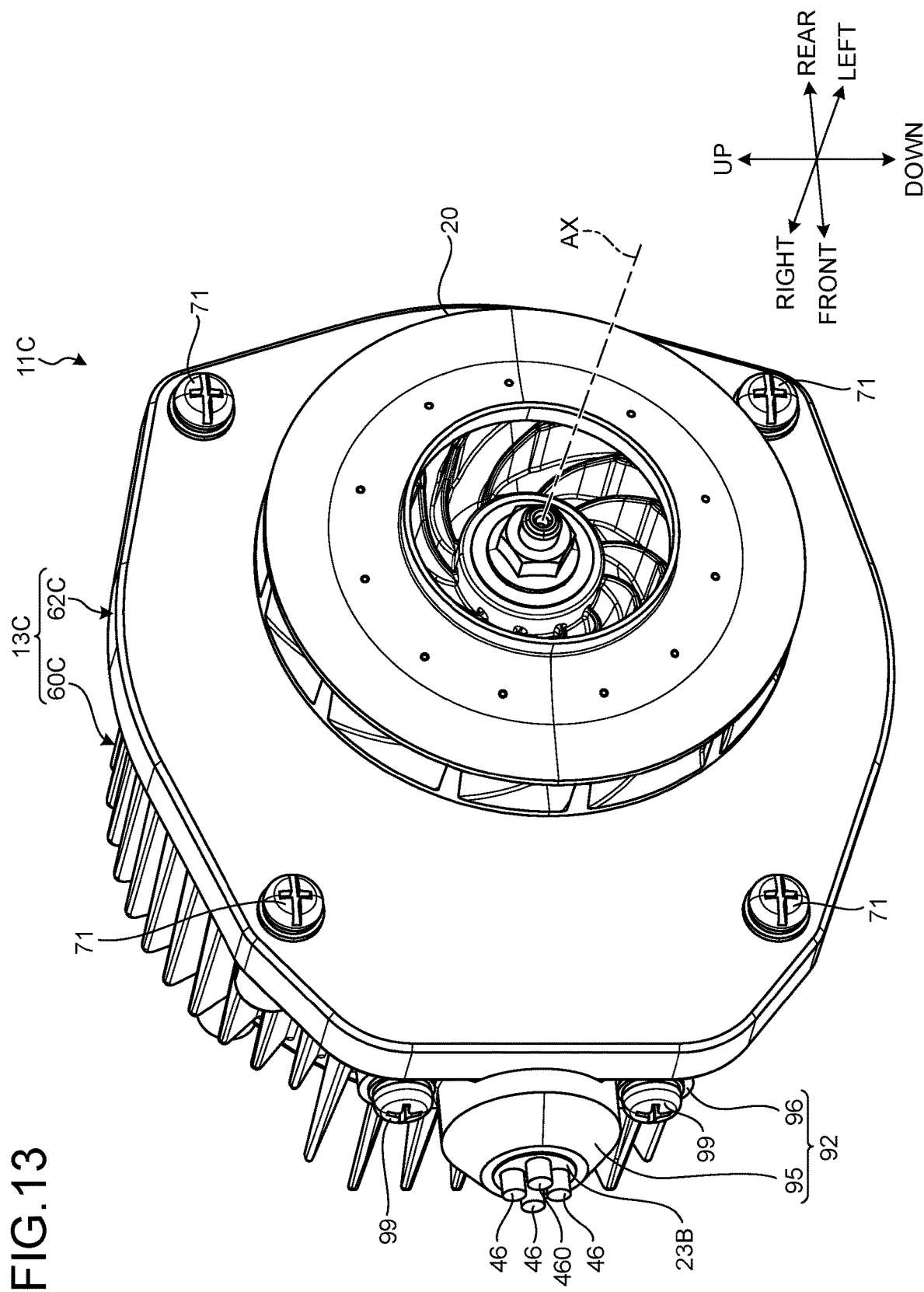
FIG. 13 is an oblique view, viewed from the left, which illustrates a motor assembly according to a third embodiment.
Figure 14:
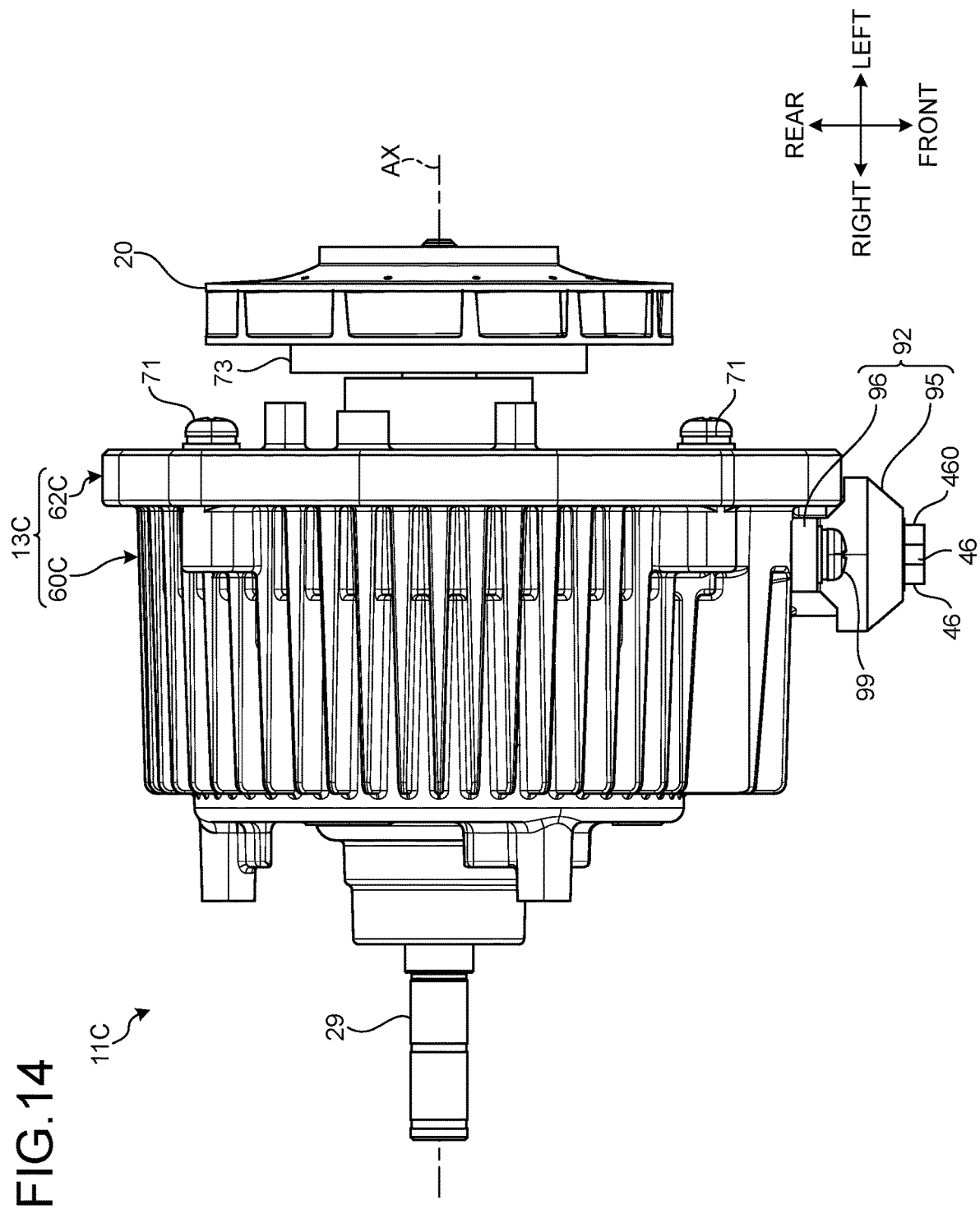
FIG. 14 is a side view illustrating the motor assembly according to the third embodiment.
Figure 15:
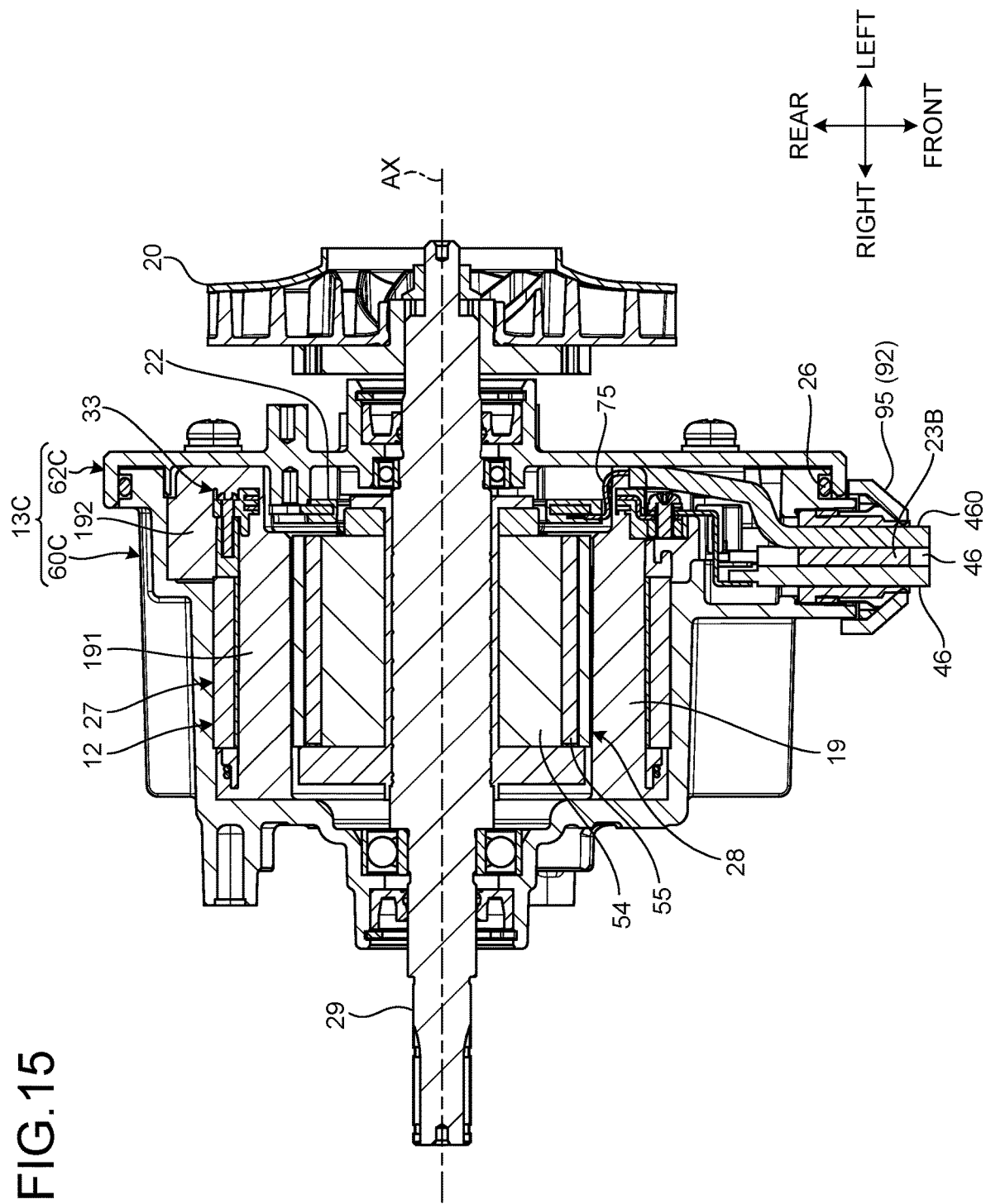
FIG. 15 is a longitudinal sectional view illustrating the motor assembly according to the third embodiment.
Figure 16:
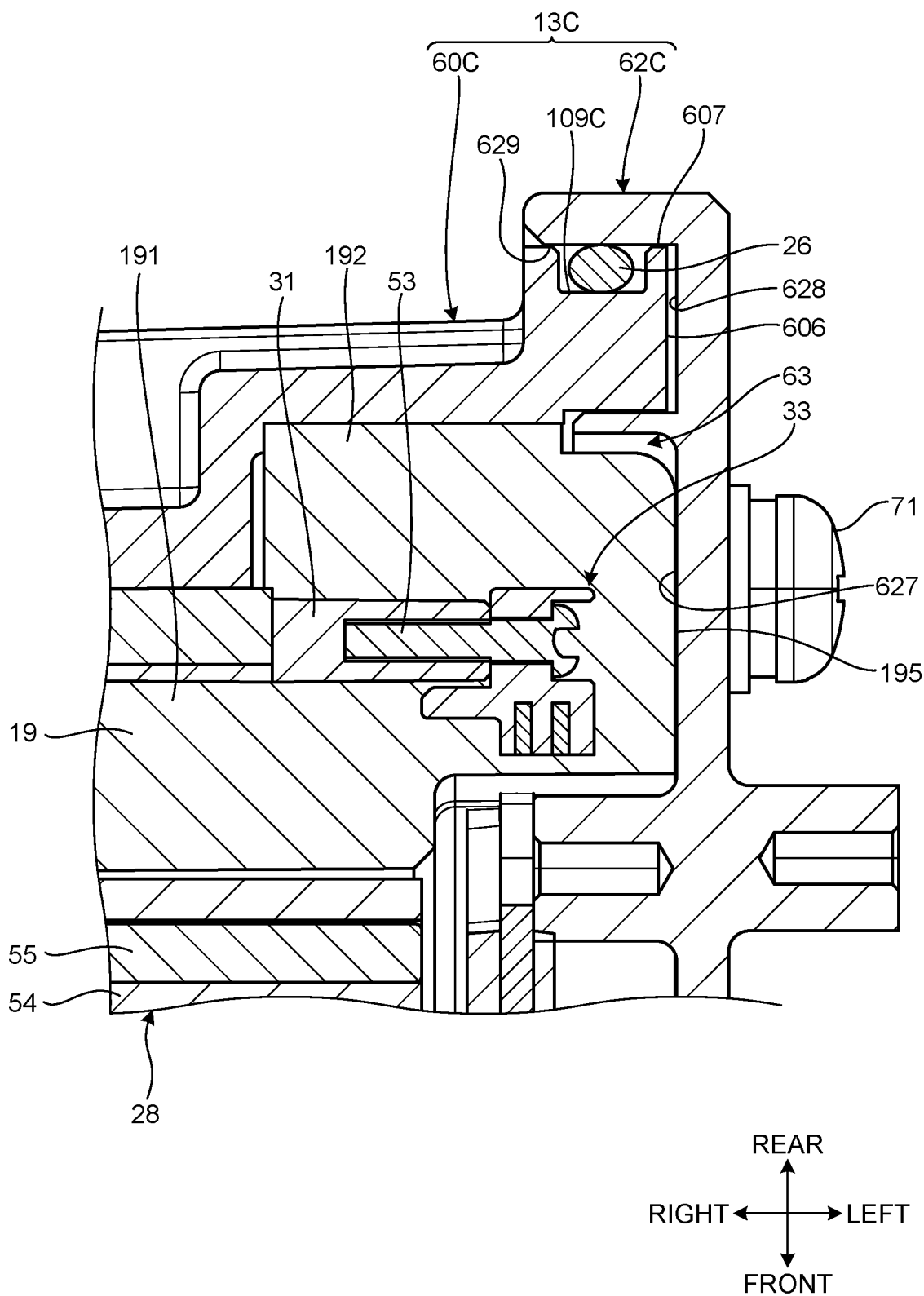
FIG. 16 is an enlarged longitudinal sectional view of a part of the motor assembly according to the third embodiment.

FIG. 13 is an oblique view, viewed from the left, which illustrates a motor assembly 11C according to the present embodiment. FIG. 14 is a side view illustrating a motor assembly 11C according to the present embodiment. FIG. 15 is a longitudinal sectional view illustrating a motor assembly 11C according to the present embodiment. FIG. 16 is an enlarged longitudinal sectional view of a part of the motor assembly 11C according to the present embodiment.

Motor Assembly

The motor assembly 11C includes a motor 12, a motor case 13C, a resin portion 19, and a seal member 26. The motor case 13C includes: a main body 60C having the insertion opening 63; and a lid 62C disposed leftward relative to the main body 60C and connected to the main body 60C so as to close the insertion opening 63. The stator 27 and the rotor 28 are accommodated in the motor case 13C. The resin portion 19 is accommodated in the motor case 13C. As in the above-described embodiment, the resin portion 19 includes: a first portion 191 covering the coils 32; and a second portion 192 disposed leftward relative to the first portion 191. The seal member 26 seals a boundary between the main body 60C and the lid 62C.

As in the second embodiment described above, the motor assembly 11C includes the tube 460 that bundles the five signal lines 75. The seal member 23B has three holes in which the three power supply lines 46 are disposed and one hole in which the tube 460 is disposed. As in the above-described embodiment, the seal member 23B is fixed to the motor case 13C by the fixing member 92.

As illustrated in FIG. 16, the lid 62C includes a contact region 627, a facing region 628, and an inner-circumferential region 629.

The contact region 627 is a partial region of the inner surface of the lid 62C facing the internal space of the motor case 13C. The contact region 627 faces rightward. The contact region 627 is in contact with the left end surface 195 of the resin portion 19. In the present embodiment, the end surface 195 of the resin portion 19 is a left end surface of the second portion 192.

The facing region 628 is disposed radially outward relative to the contact region 627. The facing region 628 faces the same direction as the contact region 627. That is, the facing region 628 faces rightward. The facing region 628 faces the left end portion of the main body 60C. The left end portion of the main body 60C is disposed around the insertion opening 63 and includes a peripheral edge region 606 of the main body 60C facing leftward. The facing region 628 faces the peripheral edge region 606 via a gap.

The inner-circumferential region 629 is disposed radially outward relative to the facing region 628. The inner-circumferential region 629 faces radially inward. The inner-circumferential region 629 is disposed so as to surround the rotation axis AX. The left end portion of the inner-circumferential region 629 and the radially outer peripheral edge portion of the facing region 628 are connected to each other. The inner-circumferential region 629 is connected to an outer-circumferential region 607 of the main body 60C facing radially outward.

In the present embodiment, the end surface 195 of the resin portion 19 facing the contact region 627 is disposed leftward relative to the peripheral edge region 606 of the main body 60C. The contact region 627 and the facing region 628 of the lid 62C are disposed in the same plane.

Each of the peripheral edge region 606 and the end surface 195 is a plane orthogonal to the rotation axis AX. The end surface 195 is disposed leftward relative to the peripheral edge region 606.

Each of the contact region 627 and the facing region 628 is a plane orthogonal to the rotation axis AX. In the left-right direction, the position of the contact region 627 and the position of the facing region 628 are the same.

In a state where the end surface 195 of the resin portion 19 and the contact region 627 of the lid 62C are in contact with each other, the outer-circumferential region 607 of the main body 60C and the inner-circumferential region 629 of the lid 62C are in contact with each other.

A recess 109C is formed in the outer-circumferential region 607. The seal member 26 is disposed in the recess 109C formed in the outer-circumferential region 607. The seal member 26 seals a boundary between the outer-circumferential region 607 of the main body 60C and the inner-circumferential region 629 of the lid 62C. The seal member 26 is disposed, in a compressed state, between the main body 60C and the lid 62C. In the present embodiment, the seal member 26 is compressed in the radial direction. The seal member 26 is in close contact with each of the main body 60C and the lid 62C.

After the stator 27 is inserted into the main body 60C through the insertion opening 63, the mold is inserted into the main body 60C. After the mold is disposed in the main body 60C, the heated and melted synthetic resin is supplied to the mold. The mold is disposed on the main body 60C such that the first portion 191 and the second portion 192 are formed on the resin portion 19. Furthermore, the mold is disposed in the main body 60C such that the end surface 195 is disposed leftward relative to the peripheral edge region 606. The resin portion 19 is formed inside the main body 60C by solidifying the synthetic resin supplied to the mold. After the stator 27 and the resin portion 19 are arranged inside the main body 60C, the rotor 28 is inserted inside the main body 60C via the insertion opening 63. Furthermore, the seal member 26 is disposed in the recess 109C of the main body 60C. After the rotor 28 is disposed inside the main body 60C and the seal member 26 is disposed in the recess 109C of the main body 60C; the lid 62C, to which the sensor board 22 has been fixed, and the main body 60C are fixed by the screw 71. By fixing the lid 62C and the main body 60C with the screw 71, the seal member 26 is disposed, in a compressed state, between the main body 60C and the lid 62C.

Since the seal member 26 is disposed between the main body 60C and the lid 62C in a compressed state, it is in close contact with each of the main body 60C and the lid 62C. Since the seal member 26 is in close contact with each of the main body 60C and the lid 62C, entry of foreign matters around the motor case 13C into the internal space of the motor case 13C is suppressed.

In the present embodiment, the seal member 26 is disposed between the outer-circumferential region 607 of the main body 60C and the inner-circumferential region 629 of the lid 62C. The seal member 26 is compressed in the radial direction. For example, even if a dimensional error in the left-right direction (axial direction) occurs in the resin portion 19, the contact region 627 and the end surface 195 can come into contact with each other in a state where the outer-circumferential region 607 and the inner-circumferential region 629 are in contact with each other so that the seal member 26 is compressed. Since the contact region 627 and the end surface 195 are in contact with each other, the heat of the coils 32 is efficiently transmitted to the lid 62C via the resin portion 19. The heat of the coils 32 transmitted to the lid 62C is dissipated from the lid 62C to the periphery of the motor case 13C.

Effects

As described above, in the embodiment, the lid 62C includes: the contact region 627 in contact with the resin portion 19; the facing region 628 facing the peripheral edge region 606 of the main body 60C disposed around the insertion opening 63 and facing one side (left side) in the axial direction; and the inner-circumferential region 629 connected to the outer-circumferential region 607 of the main body 60C facing radially outside.

In the above configuration, since the lid 62C has the contact region 627 being in contact with the resin portion 19, the heat of the coils 32 is efficiently transmitted to the lid 62C via the resin portion 19. The heat of the coils 32 transmitted to the lid 62C is dissipated to the space around the motor case 13C. Since the outer-circumferential region 607 of the main body 60C and the inner-circumferential region 629 of the lid 62C are connected to each other, it is possible to suppress an increase in the gap between the resin portion 19 and the lid 62C in a state where the main body 60C and the lid 62C are connected so that the seal member 26 is compressed.

In the embodiment, the seal member 26 seals a boundary between the outer-circumferential region 607 of the main body 60C and the inner-circumferential region 629 of the lid 62C.

In the above configuration, the seal member 26 prevents foreign matters around the motor case 13C from entering the internal space of the motor case 13C.

In the embodiment, the end surface 195 of the resin portion 19 facing the contact region 627 is disposed on one side (on the left side or leftward) in the axial direction relative to the peripheral edge region 606 of the main body 60C. The contact region 627 and the facing region 628 are disposed in the same plane.

In the above configuration, the peripheral edge region 606 of the main body 60C and the facing region 628 of the lid 62C face each other with a gap interposed therebetween, and the end surface 195 of the resin portion 19 and the contact region 627 of the lid 62C are in contact with each other. The heat of the coils 32 is efficiently transmitted to the lid 62C via the resin portion 19 due to the contact between the lid 62C and the resin portion 19, and the main body 60C and the lid 62C are appropriately connected in a state where the seal member 26 is compressed.

In the embodiment, the resin portion 19 includes: a first portion 191 covering the coils 32; and a second portion 192 disposed on one side (on the left side or leftward) in the axial direction relative to the first portion 191.

In the above configuration, an increase in the weight of the resin portion 19 is suppressed. Since the increase in the weight of the resin portion 19 is suppressed, the increase in the weight of the motor assembly 11C is suppressed. Since the increase in the weight of the motor assembly 11C is suppressed, the increase in the weight of the electric work machine 1 is suppressed.

Other Embodiments

In the above-described embodiment, the external terminals 42 and the connection terminals 47 may be omitted.

In the above-described embodiments, the motor 12 is an inner rotor brushless motor. The motor 12 may be an outer rotor brushless motor. In the outer rotor brushless motor, teeth protrude radially outward from an annular yoke.

In the above-described embodiments, the electric work machine 1 is a chain saw which is a type of an outdoor power equipment. The outdoor power equipment is not limited to a chain saw. Examples of the outdoor power equipment include a hedge-trimmer, a lawn mower, a grass mower, and a blower. Furthermore, the electric work machine 1 may be an electric tool. Examples of the electric tool include a driver drill, a vibration driver drill, an angle drill, an impact driver, a grinder, a hammer, a hammer drill, a circular saw, and a reciprocating saw.

In the above-described embodiments, the battery pack mounted to the battery mounting unit is used as the power supply of the electric work machine. As a power supply of the electric work machine, a commercial power supply (AC power supply) may be used.

Additional aspects of the present teachings include, but are not limited to:

1. An electric work machine comprising:
   a motor comprising a stator including coils, a rotor that is rotatable relative to the stator, and a rotor shaft fixed to the rotor;
   an output unit driven by the rotor shaft;
   a motor case including a main body having an insertion opening, and a lid disposed on one side in an axial direction relative to the main body and connected to the main body to close the insertion opening, the motor case accommodating the stator and the rotor;
   a resin portion that covers the coils and is accommodated in the motor case;
   a seal member that seals a boundary between the main body and the lid; and
   a thermal conducting material disposed between the lid and the resin portion.
2. The electric work machine according to the above aspect 1, wherein
   the thermal conducting material is in contact with both the lid and the resin portion.
3. The electric work machine according to the above aspect 1 or 2, wherein
   the thermal conducting material includes a thermal conductive sheet.
4. The electric work machine according to the above aspect 3, wherein
   the thermal conductive sheet is disposed, in a compressed state, between the lid and the resin portion.
5. The electric work machine according to any one of aspects 1 to 4, wherein
   at least a part of the resin portion is in contact with the main body.
6. The electric work machine according to any one of aspects 1 to 5, wherein
   the lid includes a contact region in contact with the thermal conducting material, and a connection region disposed around the insertion opening and connected to a peripheral edge region of the main body facing one side in the axial direction.
7. The electric work machine according to the above aspect 6, wherein
   the contact region is disposed on one side in the axial direction relative to the connection region.
8. The electric work machine according to the above aspect 6 or 7, wherein
   the seal member seals a boundary between the peripheral edge region of the main body and the connection region of the lid.
9. The electric work machine according to the above aspect 8, wherein
   the seal member is disposed, in a compressed state, between the main body and the lid.
10. The electric work machine according to any one of aspects 1 to 9, wherein
    the resin portion includes a first portion covering the coils, and a second portion disposed on one side in the axial direction relative to the first portion,
    the first portion and the second portion are integrated,
    each of the first portion and the second portion has a tubular shape,
    a second inner diameter indicating an inner diameter of the second portion is larger than a first inner diameter indicating an inner diameter of the first portion, and
    the thermal conducting material is disposed between the lid and the second portion.
11. An electric work machine comprising:
    a motor comprising a stator including coils, a rotor that is rotatable relative to the stator, and a rotor shaft fixed to the rotor;
    an output unit driven by the rotor shaft;
    a motor case including a main body having an insertion opening, and a lid disposed on one side in an axial direction relative to the main body and connected to the main body to close the insertion opening, the motor case accommodating the stator and the rotor;
a resin portion that covers the coils and is accommodated in the motor case; and
a seal member that seals a boundary between the main body and the lid,
wherein the lid includes a contact region in contact with the resin portion and a connection region disposed around the insertion opening and connected to a peripheral edge region of the main body facing one side in the axial direction,
the peripheral edge region of the main body and an end surface of the resin portion facing the contact region are disposed in a same plane, and
the contact region and the connection region are disposed in a same plane.

12. The electric work machine according to the above aspect 11, wherein
the peripheral edge region of the main body and the connection region of the lid come into contact with each other in a state where the end surface of the resin portion and the contact region of the lid are in contact with each other.

13. The electric work machine according to the above aspect 12, wherein
the seal member seals a boundary between the peripheral edge region of the main body and the connection region of the lid.

14. The electric work machine according to the above aspect 13, wherein
the seal member is disposed, in a compressed state, between the main body and the lid.

15. The electric work machine according to any one of aspects 11 to 14, in which
at least a part of the resin portion is in contact with the main body.

16. The electric work machine according to any one of aspects 11 to 15, wherein
the resin portion includes a first portion covering the coils, and a second portion disposed on one side in the axial direction relative to the first portion,
the first portion and the second portion are integrated,
each of the first portion and the second portion has a tubular shape,
a second inner diameter indicating an inner diameter of the second portion is larger than a first inner diameter indicating an inner diameter of the first portion, and
an end surface of the resin portion includes an end surface of the second portion.

17. An electric work machine comprising:
a motor comprising a stator including coils, a rotor that is rotatable relative to the stator, and a rotor shaft fixed to the rotor;
an output unit driven by the rotor shaft;
a motor case including a main body having an insertion opening, and a lid disposed on one side in an axial direction relative to the main body and connected to the main body to close the insertion opening, the motor case accommodating the stator and the rotor;
a resin portion that covers the coils and is accommodated in the motor case; and
a seal member that seals a boundary between the main body and the lid,
wherein the lid includes a contact region in contact with the resin portion, a facing region disposed around the insertion opening and facing a peripheral edge region of the main body facing one side in the axial direction, and an inner-circumferential region connected to an outer-circumferential region of the main body facing radially outward.

18. The electric work machine according to the above aspect 17, wherein
the seal member seals a boundary between the outer-circumferential region of the main body and the inner-circumferential region of the lid.

19. The electric work machine according to the above aspect 17 or 18, wherein
an end surface of the resin portion facing the contact region is disposed on one side in the axial direction relative to a peripheral edge region of the main body, and
the contact region and the facing region are disposed in a same plane.

20. The electric work machine according to the above aspect 19, wherein
the resin portion includes a first portion covering the coils, and a second portion disposed on one side in the axial direction relative to the first portion,
the first portion and the second portion are integrated,
each of the first portion and the second portion has a tubular shape,
a second inner diameter indicating an inner diameter of the second portion is larger than a first inner diameter indicating an inner diameter of the first portion, and
an end surface of the resin portion includes an end surface of the second portion.

According to the techniques disclosed in the present specification, it is possible to suppress an increase in weight of an electric work machine and dissipate heat of coils.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An electric work machine comprising:
a motor comprising a stator including coils, a rotor that is rotatable relative to the stator, and a rotor shaft fixed to the rotor;
an output unit driven by the rotor shaft;
a motor case comprising a main body having an insertion opening, and a lid disposed on a first side in an axial direction relative to the main body and connected to the main body to close the insertion opening, the motor case accommodating the stator and the rotor through the insertion opening; and
a resin portion that is disposed inside the main body of the motor case, the resin portion includes: a first portion covering the coils; and a second portion disposed on the first side in the axial direction relative to the first portion, the second portion being disposed closer to the lid than the first portion,
wherein
at least a part of an end surface of the first portion on a second side opposite to the lid on the first side in the axial direction is in contact with an inner surface of the main body,
the first portion and the second portion are integrated,
each of the first portion and the second portion has a tubular shape, and
a second inner diameter indicating an inner diameter of the second portion is larger than a first inner diameter indicating an inner diameter of the first portion.

2. The electric work machine according to claim 1, further comprising
a sensor board that is disposed radially inside the second portion and supports a magnetic sensor that detects rotation of the rotor.

3. The electric work machine according to claim 2, wherein the sensor board is fixed to the lid.

4. The electric work machine according to claim 3, further comprising
a substrate screw that fixes the sensor board to the lid, wherein the substrate screw is disposed radially inside the second portion.

5. The electric work machine according to claim 2, wherein
at least a part of a first surface of the sensor board faces an end surface of the rotor facing one side in the axial direction.

6. The electric work machine according to claim 5, wherein
a second surface of the sensor board facing a side opposite to the first surface faces the lid.

7. The electric work machine according to claim 5, wherein
a peripheral edge region of the first surface faces an end surface of the first portion facing one side in the axial direction.

8. The electric work machine according to claim 2, wherein
an outer-circumferential surface of the sensor board faces an inner-circumferential surface of the second portion facing radially inward.

9. The electric work machine according to claim 2, wherein
the sensor board and the resin portion are separated from each other.

10. The electric work machine according to claim 1, wherein
at least a part of the second portion is in contact with the lid.

11. The electric work machine according to claim 1, wherein
a second outer diameter indicating an outer diameter of the second portion is larger than a first outer diameter indicating an outer diameter of the first portion.

12. The electric work machine according to claim 1, wherein
at least a part of the second portion is in contact with the main body.

13. The electric work machine according to claim 1, wherein
the stator includes:
a stator core having teeth; and
an insulator fixed to the stator core,
the coils are respectively wound around the teeth via the insulator, and
the first portion covers at least a part of the stator core and the insulator.

14. The electric work machine according to claim 13, wherein
the first inner diameter is substantially equal to an inner diameter of the stator core.

15. The electric work machine according to claim 13, further comprising
a bus bar unit including a short-circuit member that connects a pair of the coils and an insulating member that covers the short-circuit member,
wherein the second portion covers the bus bar unit.

16. The electric work machine according to claim 15, wherein
the bus bar unit includes an external terminal connected to a power supply line, and
a drive current for the coils is supplied to the coils via the power supply line, the external terminal, and the short-circuit member.

17. The electric work machine according to claim 15, wherein
the bus bar unit is fixed to the insulator.

18. The electric work machine according to claim 1, further comprising
a seal member that seals a boundary between the main body and the lid.

19. An electric work machine comprising:
a motor case comprising a main body having a bottom and an opening, and a lid connected to the main body to close the opening;
a motor that is accommodated in the motor case and includes:
a stator including coils;
a rotor that is rotatable relative to the stator;
a rotor shaft fixed to the rotor, a portion of the rotor shaft protruding from the lid;
a first bearing supported on the bottom, one end of the rotor shaft being rotatably supported by the first bearing; and
a second bearing supported on the lid, another end of the rotor shaft being rotatably supported by the second bearing;
an output unit driven by a portion of the rotor shaft; and
a resin portion that includes a first portion and a second portion, wherein
the first portion is configured to cover the coils,
the second portion is disposed closer to the lid than the first portion is and disposed radially outward relative to the first portion, and
the first portion and the second portion are integral.

20. An electric work machine comprising:
a motor comprising a stator including coils, a rotor that is rotatable relative to the stator, and a rotor shaft fixed to the rotor;
an output unit driven by the rotor shaft;
a motor case comprising a main body having an insertion opening, and a lid disposed on a first side in an axial direction relative to the main body and being in direct contact with the main body to close the insertion opening, the motor case accommodating the stator and the rotor through the insertion opening; and
a resin portion that is disposed inside the main body of the motor case, the resin portion includes: a first portion covering the coils; and a second portion disposed on the first side in the axial direction relative to the first portion,
wherein
the first portion and the second portion are integrated,
each of the first portion and the second portion has a tubular shape, and
a second inner diameter indicating an inner diameter of the second portion is larger than a first inner diameter indicating an inner diameter of the first portion.

* * * * *